US011699095B2

(12) United States Patent
Kanagawa et al.

(10) Patent No.: US 11,699,095 B2
(45) Date of Patent: Jul. 11, 2023

(54) CROSS-DOMAIN RECOMMENDER SYSTEMS USING DOMAIN SEPARATION NETWORKS AND AUTOENCODERS

(71) Applicant: YAHOO JAPAN CORPORATION, Tokyo (JP)

(72) Inventors: Heishiro Kanagawa, Tokyo (JP); Hayato Kobayashi, Tokyo (JP); Nobuyuki Shimizu, Tokyo (JP); Yukihiro Tagami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 592 days.

(21) Appl. No.: 16/250,460

(22) Filed: Jan. 17, 2019

(65) Prior Publication Data
US 2019/0228336 A1 Jul. 25, 2019

(30) Foreign Application Priority Data
Jan. 19, 2018 (JP) .................... 2018-007286

(51) Int. Cl.
*G06N 20/00* (2019.01)
*G06N 5/02* (2023.01)

(52) U.S. Cl.
CPC ............ *G06N 20/00* (2019.01); *G06N 5/02* (2013.01)

(58) Field of Classification Search
CPC ........ G06N 20/00; G06N 5/02; G06N 3/0472; G06N 20/10; G06N 3/0445; G06N 3/084; G06N 3/0481; G06N 3/0454
(Continued)

(56) References Cited

U.S. PATENT DOCUMENTS

| 2004/0194008 A1* | 9/2004 | Garudadri ............. H03M 13/29 714/821 |
| 2006/0133423 A1* | 6/2006 | Hamada ........... H04N 21/23614 370/474 |

(Continued)

FOREIGN PATENT DOCUMENTS

| JP | 2012-150561 A | 8/2012 |
| JP | 2017-054214 A | 3/2017 |

OTHER PUBLICATIONS

Bousmalis et al., "Domain Separation Networks," in 29 Advances in Neural Info. Processing Sys. 343-51 (2016). (Year: 2016).*

(Continued)

*Primary Examiner* — Kamran Afshar
*Assistant Examiner* — Ryan C Vaughn
(74) *Attorney, Agent, or Firm* — Oliff PLC

(57) ABSTRACT

A training apparatus includes an acquiring unit that acquires a first model including an input layer to which input information is input; a plurality of intermediate layers that executes a calculation based on a feature of the input information that has been input; and an output layer that outputs output information that corresponds to output of the intermediate layer. The training apparatus includes a training unit that trains the first model such that, when predetermined input information is input to the first model, the first model outputs predetermined output information that corresponds to the predetermined input information and intermediate information output from a predetermined intermediate layer among the intermediate layers becomes close to feature information that corresponds to a feature of correspondence information that corresponds to the predetermined input information.

11 Claims, 7 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2012/0203546 A1* | 8/2012 | Yamanashi | G10L 19/24 |
| | | | 704/205 |
| 2016/0100216 A1* | 4/2016 | Chujoh | H04N 21/234327 |
| | | | 725/93 |
| 2018/0330200 A1* | 11/2018 | Shibata | G06T 1/0014 |
| 2019/0017374 A1* | 1/2019 | Misra | G06N 3/084 |
| 2019/0122099 A1* | 4/2019 | Dung | G06N 20/00 |
| 2019/0156248 A1* | 5/2019 | Togashi | G06K 9/6256 |
| 2020/0104288 A1* | 4/2020 | Tao | G06N 20/00 |

OTHER PUBLICATIONS

Donahue et al., "DeCAF: A Deep Convolutional Activation Feature for Generic Visual Recognition," in Int'l Conf. Machine Learning 647-55 (2014). (Year: 2014).*

Ducau, Adversarial Autoencoders (with Pytorch), https://blog.paperspace.com/adversarial-autoencoders-with-pytorch/ (2017). (Year: 2017).*

Jan. 22, 2019 Office Action issued in Japanese Patent Application No. 2018-007286.

* cited by examiner

FIG.4

| DATA ID | DOMAIN INFORMATION | USER INFORMATION | CONTENT INFORMATION | ... |
|---|---|---|---|---|
| DATA #1-1 | DOMAIN #1 | USER #1 | CONTENT #1-1 | ... |
| DATA #1-2 | DOMAIN #1 | USER #2 | CONTENT #1-2 | ... |
| ... | ... | ... | ... | ... |

| DATA ID | DOMAIN INFORMATION | CONTENT INFORMATION | ... |
|---|---|---|---|
| DATA #2-1 | DOMAIN #2 | CONTENT #2-1 | ... |
| DATA #2-2 | DOMAIN #2 | CONTENT #2-2 | ... |
| ... | ... | ... | ... |

32

CROSS-DOMAIN RECOMMENDER SYSTEMS USING DOMAIN SEPARATION NETWORKS AND AUTOENCODERS

CROSS-REFERENCE TO RELATED APPLICATIONS

The present application claims priority to and incorporates by reference the entire contents of Japanese Patent Application No. 2018-007286 filed in Japan on Jan. 19, 2018.

BACKGROUND OF THE INVENTION

1. Field of the Invention

The present invention relates to a training apparatus, a training method, and a non-transitory computer readable storage medium.

2. Description of the Related Art

There are conventionally known technologies for providing users with various types of information. One example of the known technologies is a technology of estimating information that corresponds to a user such as information that is highly relevant to the user or information in which the user gets interested, based on information related to the user, such as information selected by the user in the past or the attributes of the user, and providing the estimated information to the user. [Patent Literature 1] Japanese Laid-open Patent Publication No. 2012-150561

Unfortunately, there is a possibility that the above-described conventional technology is not able to correctly estimate information that corresponds to a user.

For example, the above-described conventional technology learns the co-occurrence between information related to the user and the target information to be delivered based on the selection history of the user and, based on the learnt co-occurrence, the information that corresponds to the user is estimated. Unfortunately, according to this technology, an insufficient selection history of the user may cause a decrease in the learning accuracy and difficulty in high-accuracy estimation of information that corresponds to the user.

Furthermore, the technology of cross-domain recommendation is known, which provides a user using multiple services with information related to one service while the user is using another service. For example, there is a known technology in which a first user having a certain attribute, using a movie delivery service, is provided with a recommendation on movie content that has been selected in the movie delivery service by a second user having the search history common to that of the first user in a Web search service. However, when there are a small number of users commonly using each service, there is a possibility that it is difficult to estimate information that is recommended by cross-domain recommendation with high accuracy.

SUMMARY OF THE INVENTION

It is an object of the present invention to at least partially solve the problems in the conventional technology.

According to one aspect, a training apparatus includes an acquiring unit that acquires a first model including an input layer to which input information is input; a plurality of intermediate layers that execute a calculation based on a feature of the input information that has been input; and an output layer that outputs output information that corresponds to output of the intermediate layer. The training apparatus includes a training unit that trains the first model such that, when predetermined input information is input to the first model, the first model outputs predetermined output information that corresponds to the predetermined input information and intermediate information output from a predetermined intermediate layer among the intermediate layers becomes close to feature information that corresponds to a feature of correspondence information that corresponds to the predetermined input information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram that illustrates an example of information registered in a first-domain information database according to the embodiment;

FIG. 5 is a diagram that illustrates an example of information registered in a second-domain information database according to the embodiment;

DETAILED DESCRIPTION OF THE PREFERRED EMBODIMENTS

Figure 1:
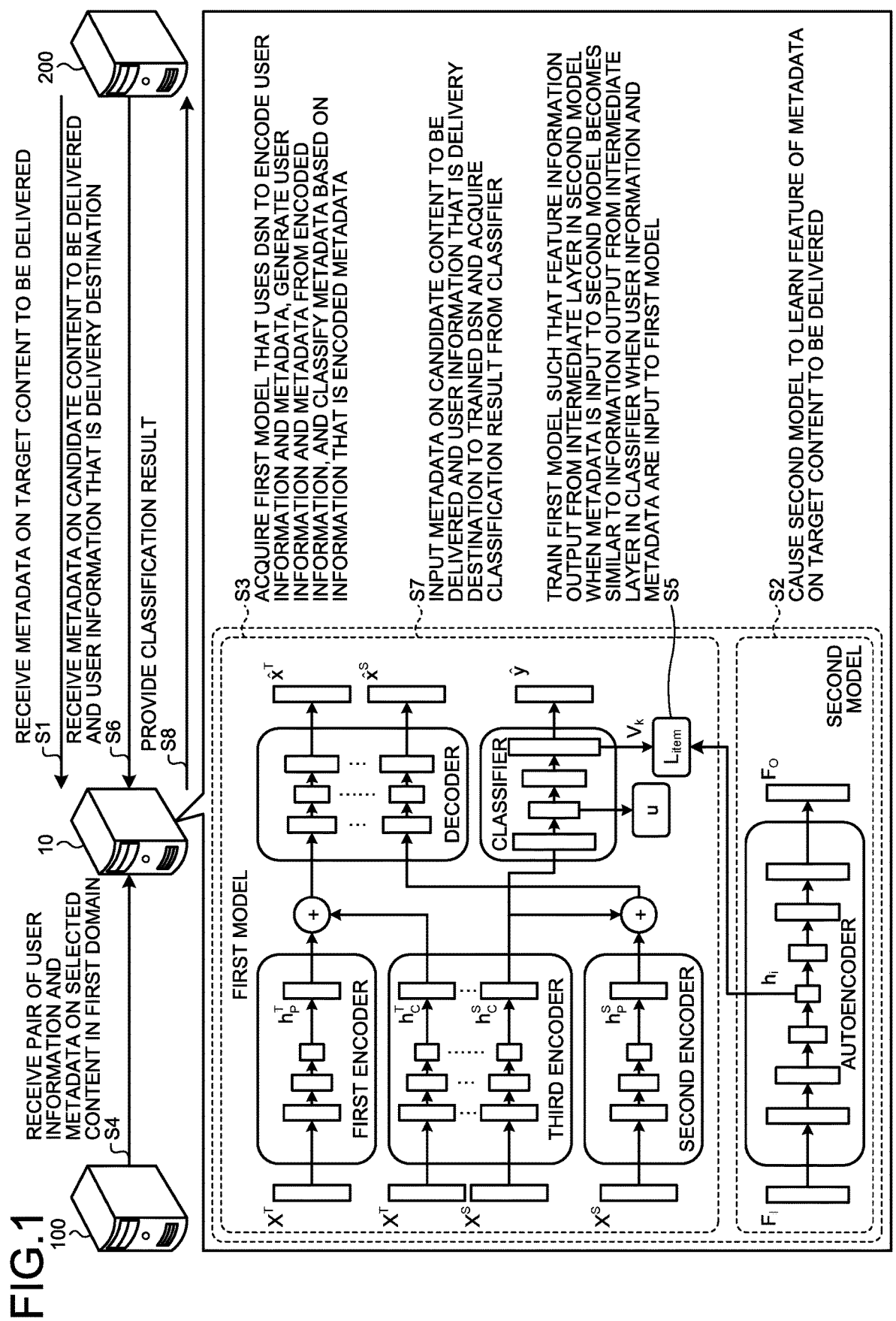
FIG. 1 is a diagram that illustrates an example of an information providing apparatus according to an embodiment.

With reference to drawings, a detailed explanation is given below of an aspect (hereinafter, referred to as "embodiment") for implementing a training apparatus, a training method, and the non-transitory computer readable storage medium according to the subject application. Furthermore, the embodiment is not a limitation on the training apparatus, the training method, and the non-transitory computer readable storage medium according to the subject application. Moreover, the same components are attached with the same reference numeral and duplicated explanations are omitted in each embodiment described below.

1. OUTLINE OF THE INFORMATION PROVIDING APPARATUS

With reference to FIG. 1, an example of an information providing apparatus 10, which is an example of the training apparatus, is explained below. FIG. 1 is a diagram that illustrates an example of the information providing apparatus according to the embodiment. Here, the example illustrated in FIG. 1 describes an example of the training process executed by the information providing apparatus 10 by using information provided by a first domain server 100 and a second domain server 200.

The information providing apparatus 10 is an information processing apparatus that may communicate with the first domain server 100 and the second domain server 200 through a predetermined network N (for example, see FIG. 3) such as the Internet, and it is implemented by using, for example, a server device or a cloud system. Furthermore, the information providing apparatus 10 may communicate with any number of the first domain server 100 and the second domain server 200 (hereafter, sometimes simply collectively referred to as "server") via the network N. Moreover, the information providing apparatus 10 may communicate with any number of servers belonging to any domain.

The first domain server 100 is an information processing apparatus that provides a predetermined service, and it is implemented by using a server device, cloud system, or the like. Furthermore, the first domain server 100 provides a service indicated by the predetermined first domain. For example, the first domain server 100 provides a content delivery service for delivering accessible web content to a user by using a URL (Uniform Resource Locator) including a predetermined domain name "domain #1" and providing the user with various types of content through the web content delivered to the user.

The second domain server 200 is an information processing apparatus that provides a predetermined service, and it is implemented by using a server device, cloud system, or the like. Furthermore, the second domain server 200 provides a service indicated by a predetermined second domain different from the first domain. For example, the second domain server 200 provides a content delivery service for delivering accessible web content to a user by using a URL (Uniform Resource Locator) including a predetermined domain name "domain #2" and providing the user with various types of content through the web content delivered to the user.

Furthermore, the domain #1 and the domain #2 described above do not need to be completely separate domains as long as they are different domains. For example, the domain #1 and the domain #2 may be subdomains belonging to a common domain #0 or subdomains belonging to different domains.

Here, the first domain server 100 and the second domain server 200 store, as logs, delivered content and user information about the user to which the content is delivered in a related manner. For example, as the user information, the first domain server 100 and the second domain server 200 store the identifier for identifying a user, or attribute information on a user, such as a demographic attribute or psychographic attribute. Here, with regard to a certain user, the first domain server 100 and the second domain server 200 may store the identifier and the attribute information that are common and identical for each domain or may store different types of identifiers or attribute information. Moreover, the first domain server 100 and the second domain server 200 may store attribute information that is previously registered by a user or may store attribute information that is estimated based on user's browsing history, buying history, search query history input by a user, or the like. This kind of estimation of attribute information may use any estimation technique.

Furthermore, the first domain server 100 and the second domain server 200 may provide any service. For example, the first domain server 100 and the second domain server 200 may deliver web content for introducing or purchasing commodities and services in an electronic mall or may deliver web content related to news, a web search, a portal site, or the like. Moreover, the first domain server 100 and the second domain server 200 may deliver an SNS (Social Networking Service) or microblog.

Below, as an example of the training process executed by the information providing apparatus 10, the first domain server 100 and the second domain server 200 provide a content delivery service for moving images, and the like, as a service related to the first domain and the second domain.

1-1. Outline of the Training Process

Here, during a delivery process to deliver content to a certain user, it is possible to use a technique for delivering or recommending content that corresponds to the user, e.g., content that is estimated to be interesting to the user, or content that is likely to be selected by the user. For example, it is possible to use a technique of previously learning the co-occurrence between the history of content selected by the user in the past and attribute information on the user and, based on a learning result, estimating content that corresponds to the user as the delivery destination. However, according to this technology, when there are not so many pairs of the history of content selected by the user and the attribute information on the user, there is a possibility of a decrease in the accuracy with which content is estimated.

Furthermore, it is possible to use the technology of cross-domain recommendation in which the viewing history or the selection history of the user in content of the second domain is estimated based on the viewing history or the selection history of content in the first domain. For example, there is a known technology in which, when a first user having a certain attribute uses a movie delivery service, movie content selected by a second user in the movie delivery service is recommended, the search history of the second user in a Web search service being common to that of the first user. However, when there are a small number of users who commonly use each service, there is a possibility that information to be recommended in the cross-domain recommendation may not be accurately estimated.

Therefore, the information providing apparatus 10 executes the following training process. First, the information providing apparatus 10 acquires the first model including: an input layer to which input information is input; a plurality of intermediate layers that perform calculations based on the feature of the input information that has been input; and an output layer that outputs the output information that corresponds to output of the intermediate layer. Furthermore, the information providing apparatus 10 trains the first model such that, when predetermined input information is input to the first model, the first model outputs predetermined output information that corresponds to the predetermined input information and the intermediate information output from a predetermined intermediate layer among the intermediate layers becomes close to the feature information that corresponds to the feature of correspondence information that corresponds to the predetermined input information.

Here, the information providing apparatus 10 trains the first model such that, when input information related to the first domain is input as the predetermined input information to the first model, the information indicating classification of the predetermined input information that has been input is output as the output information and the intermediate information becomes close to feature information that takes account of the correspondence information related to the second domain different from the first domain.

For example, the information providing apparatus 10 trains the first model such that, when the first information and the second information associated with the first information are input as the predetermined input information to the first model, a classification result of the second information corresponding to the first information is output as the output information and the intermediate information becomes close to the feature information that corresponds to the feature of the third information associated with the first information. More specifically, the information providing apparatus 10 trains the first model by using the first information and the second information belonging to the first domain and the third information belonging to the second domain different from the first domain. For example, the information providing apparatus 10 trains the first model by using the first information indicating the feature of the user, the second information indicating the selection target selected by the user having the feature indicated by the first information, and the third information indicating the selection target that is selected by the user having the feature indicated by the first information and that is different from the selection target indicated by the second information.

For example, when there are sufficient pairs of content belonging to the first domain and attribute information on the user to which the content has been delivered, the model having learnt the co-occurrence between the content and the attribute information is capable of accurately estimating the content that corresponds to the user based on the attribute information on the user. Conversely, when there are not sufficient pairs of content belonging to the second domain and attribute information on the user to which the content has been delivered, it can be difficult for the model having learnt the co-occurrence between the content and the attribute information to accurately estimate content that corresponds to the user based on the attribute information of the user. As a result, for example, a problem that is called a cold start occurs when, for example, not much time has elapsed since a service belonging to the second domain started.

Furthermore, with regard to content delivered in a service belonging to the second domain, i.e., content belonging to the second domain, it is considered that there are a certain number of pieces of content when the service belonging to the second domain starts. Furthermore, it is also considered that content that belongs to the second domain and that corresponds to the user, which is the delivery destination, corresponds to content that belongs to the first domain and that corresponds to the user that is the delivery destination. For example, when a news story is delivered in the first domain and a moving image is delivered in the second domain, it is considered that there is a high possibility that the user who has selected a predetermined news story in the first domain likes the moving image having the co-occurrence with the predetermined news story.

Therefore, the information providing apparatus 10 conducts training by considering the feature of content belonging to the second domain so as to cause the model to learn the co-occurrence between the attribute information on the user belonging to the first domain and the information indicating content (e.g., metadata on content). For example, the information providing apparatus 10 has previously generated the second model that has learnt the feature of content belonging to the second domain. More specifically, the information providing apparatus 10 has previously generated the second model that extracts a feature of content belonging to the second domain. Then, the information providing apparatus 10 makes correction based on the feature obtained when the information indicating the content is input to the second model when the first model is caused to learn the co-occurrence between the information indicating content of the first domain and the attribute information of the user who has selected the content.

In this way, for learning a feature of information belonging to the first domain, the information providing apparatus 10 conducts training by considering a feature of information belonging to the second domain. More specifically, to cause the first model to learn the feature of the relationship (e.g., the feature of the co-occurrence) between a moving image in a service belonging to the first domain and a user, the information providing apparatus 10 trains the first model such that output of the intermediate layer included in the first model becomes similar to the information indicating a feature of information belonging to the second domain.

When such correction is performed, the first model generates, from the moving image belonging to the first domain, information that is similar to the information indicating the feature of a moving image belonging to the second domain as the information indicating the feature of the moving image belonging to the first domain. That is, the first model generates information indicating the feature of the moving image belonging to the first domain in consideration of the feature of the moving image belonging to the second domain. As a result, as the first model estimates in consideration of the feature of a moving image belonging to the second domain to some extent, the relationship between a moving image in the second domain and the user may be estimated with a certain accuracy even when there is a little amount of delivery history with regard to the second domain.

1-2. Example of Training Process

An example of the training process executed by the information providing apparatus 10 is explained below. Furthermore, in the following explanation, the DSN (Domain Separation Network) is used as the first model; however, this is not a limitation on the embodiment. Moreover, in the following explanation, an example of the training process executed by the information providing apparatus 10 is an example of the process to train the first model so as to estimate the relationship between content related to the second domain and the attribute of the user, which is the delivery destination, by correcting based on the feature of content belonging to the second domain during learning of the feature of the relationship between content belonging to the first domain and the user.

First, the information providing apparatus 10 receives, from the second domain server 200, metadata on the target content to be delivered as the information indicating the target content to be delivered (Step S1). For example, when a movie is delivered in a service of the second domain, the information providing apparatus 10 receives metadata indicating the title of the content, genre, director, cast, screen time, year of release, or the like, as metadata on the content.

In such a case, the information providing apparatus 10 causes the second model to learn a feature of the metadata on the target content to be delivered (Step S2). For example, the information providing apparatus 10 generates, as the second model, a model that includes a plurality of nodes connected at multiple stages, gradually decreases the dimensionality of information that is input (hereafter, referred to as "input information") to generate information (hereafter, referred to as "feature information") indicating a feature of the input information, and gradually increases the dimensionality of the generated feature information to generate the output information that corresponds to the input information. More specifically, the information providing apparatus 10 trains a model called an autoencoder.

For example, the information providing apparatus 10 inputs the metadata on content belonging to the second domain as input information $F_I$ to the second model, which is an autoencoder, and obtains input information $F_O$ that is output from the second model. Then, the information providing apparatus 10 corrects a connection coefficient, i.e., a value of weight or neuron weight, between the nodes included in the second model such that the difference between the input information $F_I$ and the input information $F_O$ becomes small. For example, the information providing apparatus 10 trains the second model such that the input information and the output information have the same value by using a training technique such as back propagation. As a result, the information providing apparatus 10 may obtain the second model that has learnt a feature of the content belonging to the second domain.

Then, the information providing apparatus 10 acquires the first model that uses the DSN to encode the user information and the metadata, generate (decode) the user information and the metadata from the encoded information, and classify the metadata based on the information that is the encoded metadata (Step S3). More specifically, the information providing apparatus 10 generates the first model that indicates a classification result of the second information based on the relationship between the first information and the second information when the first information and the second information are input. For example, the information providing apparatus 10 generates the first model that is configured to output the information indicating the degree of certainty with which the user corresponding to the input user information corresponds to the content having the input metadata after the attribute information on the user as user information and the metadata on the content are input.

For example, the information providing apparatus 10 generates the first model that includes a first encoder, a second encoder, a third encoder, a decoder, and a classifier. Each of the first encoder, the second encoder, the third encoder, the decoder, and the classifier may be implemented by using a neural network having any structure, such as DNN, CNN (Convolutional Neural Network), RNN (Recurrent Neural Network), or LSTM. Furthermore, the first model is configured by using a neural network having at least a plurality of intermediate layers (hidden layers) as a whole.

A specific example of the first model is explained below. For example, the information providing apparatus 10 acquires the first encoder that encodes first information $X^T$ input to the first model. The first encoder performs a calculation on the first information $X^T$ based on the activation function that corresponds to a node in each layer and a connection coefficient between the nodes to generate first encoded information $H^T_p$ that is the encoded first information $X^T$. Furthermore, the first encoder is sometimes called, for example, a target private encoder.

Furthermore, the information providing apparatus 10 acquires the second encoder that encodes second information $X^S$ that is input to the first model. The second encoder performs a calculation on the second information $X^S$ based on the activation function that corresponds to a node in each layer and a connection coefficient between the nodes to generate second encoded information $H^S_p$ that is the encoded second information $X^S$. Furthermore, the second encoder is sometimes called, for example, a source private encoder.

Furthermore, the information providing apparatus 10 acquires the third encoder that encodes the first information $X^T$ and the second information $X^S$. The third encoder performs a calculation on the first information $X^T$ based on the activation function that corresponds to a node in each layer and a connection coefficient between the nodes to generate third encoded information $H^T_C$ that is the encoded first information $X^T$. Moreover, the third encoder performs a calculation on the second information $X^S$ based on the activation function that corresponds to a node in each layer and a connection coefficient between the nodes to generate fourth encoded information $H^S_C$ that is the encoded second information $X^S$.

Here, the third encoder may be implemented by using an encoder (hereafter, referred to as "first sub-encoder") that encodes the first information $X^T$ and an encoder (hereafter, referred to as "second sub-encoder") that encodes the second information $X^S$. For example, the first sub-encoder and the second sub-encoder are configured by using a neural network having the same configuration. More specifically, the first sub-encoder and the second sub-encoder may be configured by using a neural network having the same number of layers, the same number of nodes in each layer, and the same topology among the nodes.

Furthermore, the third encoder may be implemented by using a single neural network having functionality of the first sub-encoder and functionality of the second sub-encoder. Specifically, the third encoder may perform a function using a single neural network to generate the third encoded information $H^T_C$ that is the encoded first information $X^T$ and generate the fourth encoded information $H^S_C$ that is the encoded second information $X^S$. Furthermore, the third encoder is sometimes called a shared encoder.

Furthermore, the information providing apparatus 10 acquires a decoder that generates first decoded information $X'^T$ from the first encoded information $H^T_p$ and the third encoded information $H^T_C$ and generates second decoded information $X'^S$ from the second encoded information $H^S_p$ and the fourth encoded information $H^S_C$. For example, the information providing apparatus 10 acquires a decoder that performs a calculation on the sum of the first encoded information $H^T_p$ and the third encoded information $H^T_C$ based on the activation function that corresponds to a node in each layer and a connection coefficient between the nodes to generate the first decoded information $X'^T$ and performs a calculation on the sum of the second encoded information $H^S_p$ and the fourth encoded information $H^S_C$ based on the activation function that corresponds to a node in each layer and a connection coefficient between the nodes to generate the second decoded information $X'^S$.

Furthermore, as is the case with the third encoder, the decoder may be implemented by using a neural network that generates the first decoded information $X'^T$ from the first encoded information $H^T_p$ and the third encoded information $H^T_C$ and a neural network that generates the second decoded information $X'^S$ from the second encoded information $H^S_p$ and the fourth encoded information $H^S_C$. Further, the decoder may use a single neural network to generate the first decoded information $X'^T$ from the first encoded information $H^T_p$ and the third encoded information $H^T_C$ and generate the second decoded information $X'^S$ from the second encoded information $H^S_p$ and the fourth encoded information $H^S_C$. Here, the decoder is sometimes called a shared decoder. Moreover, in the example illustrated in FIG. 1, X' is indicated by X with the hat symbol added thereto.

Furthermore, the information providing apparatus 10 acquires a classifier that includes a plurality of intermediate layers and generates classification information y' indicating a classification result of the second information $X^S$ from the fourth encoded information $H^S_C$ generated by the third encoder. The classifier performs a calculation on the fourth encoded information $H^S_C$ based on the activation function that corresponds to a node in each layer and a connection coefficient between the nodes to generate the classification information y' indicating a classification result of the fourth encoded information $H^S_C$. Furthermore, the explanation below for the training process explains the perspective in which the classifier conducts classification. Moreover, in the example illustrated in FIG. 1, y' is indicated by y with the hat symbol added thereto.

Then, the information providing apparatus 10 receives the pair of the user information and the metadata on the selected content in the first domain from the first domain server 100 (Step S4). More specifically, the information providing apparatus 10 receives, as training data, the pair of the metadata on the content (i.e., moving image) belonging to the first domain and the user information on the user who has received the content delivered. As used herein, the term "data" is used both to refer to a singular datum and as a singular group noun to refer to plural items of data.

In such a case, the information providing apparatus 10 trains the first model such that the feature information output from the intermediate layer in the second model when the metadata is input to the second model becomes similar to the information output from the intermediate layer in the classifier when the user information and the metadata are input to the first model (Step S5). More specifically, the information providing apparatus 10 inputs the first information $X^T$ as user information and inputs the second information $X^S$ as metadata to the first model and acquires the first decoded information $X'^T$, the second decoded information $X'^S$, and the classification information y'. Then, the information providing apparatus 10 trains the first model such that the difference between the first decoded information $X'^T$ and the first information $X^T$ becomes small and the difference between the second decoded information $X'^S$ and the second information $X^S$ becomes small. Also, the information providing apparatus 10 trains the first model such that the difference between the value of the classification information y' and the value indicating that the content having the input metadata corresponds to the user having the input user information becomes small. That is, the information providing apparatus 10 trains the first model so as to output the classification information y' indicating that the user having the input user information has selected the input metadata. For example, the information providing apparatus 10 updates a connection coefficient between the nodes included in each of the encoders, the decoder, and the classifier included in the first model.

Here, the information providing apparatus 10 inputs the metadata, which has been input to the first model, to the second model and acquires information output from a predetermined intermediate layer among the intermediate layers included in the second model as feature information $h_i$. For example, the information providing apparatus 10 acquires, as the feature information $h_i$, output from the intermediate layer having the smallest number of nodes among the intermediate layers included in the second model, i.e., the intermediate layer that outputs information indicating a feature of input information most straightforwardly, when the metadata is input to the second model. Furthermore, the information providing apparatus 10 acquires, as intermediate information $V_k$, output of the intermediate layer closest to the output layer among the intermediate layers included in the classifier. Then, the information providing apparatus 10 trains the first model such that the difference between the feature information $h_i$ and the intermediate information $V_k$ becomes small.

For example, when certain metadata and user information are input, the information providing apparatus 10 determines that the difference between the first decoded information $X'^T$ and the first information $X^T$ is a first index, the difference between the second decoded information $X'^S$ and the second information $X^S$ is a second index, the difference between the value of the desired classification information and the value of the actual classification information y' is a third index, and the difference between the feature information $h_i$ extracted from the metadata by using the second model that has learnt the feature of the content belonging to the second domain and the intermediate information $V_k$ that is output of the intermediate layer in the classifier is a fourth index. Then, the information providing apparatus 10 updates a connection coefficient provided in the first model such that the sum of the first index to the fourth index is minimized.

After this training is conducted, the first model learns the relationship between the first information and the second information belonging to the first domain in consideration of the feature of the third information (i.e., metadata on content belonging to the second domain) that belongs to the same class (classification) as the second information (i.e., metadata on the content belonging to the first domain) and that belongs to the second domain. That is, the first model learns the feature of the relationship between the feature of the content belonging to the first domain and the feature of the user information in consideration of the feature of the content belonging to the second domain.

When the user information on the user who is to receive a service belonging to the second domain and the metadata on the content in the second domain that is to be delivered to the user are input to the first model that has learnt as above, it is assumed that the content belonging to the second domain may be classified in consideration of the feature of the content belonging to the second domain. Thus, the information providing apparatus 10 may obtain a model that is capable of classifying content belonging to the second domain in accordance with the attribute of a user even when there is little history of a user having received a service belonging to the second domain.

For example, the information providing apparatus 10 receives metadata on the candidate content to be delivered and the user information that is the delivery destination from the second domain server 200 (Step S6). In such a case, the information providing apparatus 10 inputs the metadata on the candidate content to be delivered and the user information that is the delivery destination to the trained first model, the DSN, and acquires a classification result from the classifier (Step S7). More specifically, the information providing apparatus 10 inputs, to the first model, the user information on the user that is the delivery destination as the first information and the metadata on the candidate content to be delivered as the second information.

Then, the information providing apparatus 10 provides the second domain server 200 with a classification result output from the classifier in the first model (Step S8). For example, the information providing apparatus 10 provides a classification result indicating whether the candidate content to be delivered is content that corresponds to the user as the delivery destination. As a result of this processing, the information providing apparatus 10 may accurately estimate whether the content belonging to the second domain corresponds to the user as the delivery destination even when there is little usage history of the second domain, such as during cold start.

1-3. Training of the First Model

As described above, the information providing apparatus 10 trains the first model such that, when the first information and the second information associated with the first information are input as predetermined input information to the first model, a classification result of the second information is output as output information and the intermediate information becomes close to the feature information that corresponds to the feature of the third information associated with the first information. More specifically, the information providing apparatus 10 trains the first model by using the first information and the second information belonging to the first domain and the third information belonging to the second domain different from the first domain.

For example, the information providing apparatus 10 trains the first model by using the first information (i.e., user information) indicating the feature of the user, the second information (e.g., metadata on the content belonging to the first domain) indicating the selection target selected by the user having the feature indicated by the first information, and the third information (e.g., metadata on the content belonging to the second domain) indicating the selection target different from the selection target indicated by the second information. More specifically, the information providing apparatus 10 acquires the second model having learnt the feature of the third information. Then, during training of the first model, the information providing apparatus 10 trains the first model such that the intermediate information becomes close to the feature information generated from the second information by the second model.

For example, the information providing apparatus 10 acquires, as the second model, the second model having learnt the feature of the third information that is information of the same type as the second information (for example, information indicating the target of the same type). Furthermore, the information providing apparatus 10 trains the first model such that information indicating classification of the second information is output as output information when the first information and the second information are input to the first model and the intermediate information becomes close to the feature information generated by the second model when the second information is input to the second model.

Furthermore, the information providing apparatus 10 acquires the first model including the first encoder that outputs the first encoded information by encoding the first information when the first information is input. Further, the information providing apparatus 10 acquires the first model including the second encoder that outputs the second encoded information by encoding the second information when the second information is input. Moreover, the information providing apparatus 10 acquires the first model including the third encoder that outputs the third encoded information by encoding the first information and the fourth encoded information by encoding the second information when the first information and the second information are input.

Furthermore, the information providing apparatus 10 acquires the first model including the decoder that generates the first decoded information from the first encoded information and the third encoded information and generates the second decoded information from the second encoded information and the fourth encoded information. Further, the information providing apparatus 10 acquires the first model including the classifying unit that includes a plurality of intermediate layers and generates classification information indicating a classification result of the second information from the fourth encoded information. Moreover, the information providing apparatus 10 trains the first model such that the first information and the first decoded information become similar, the second information and the second decoded information become similar, and information output from a predetermined intermediate layer among the intermediate layers included in the classifying unit becomes close to feature information.

For example, the information providing apparatus 10 acquires the model including the plurality of layers as the third encoder and trains the first model such that information output from each layer included in the third encode unit when the third encoded information is generated from the first information becomes close to information output from each layer included in the third encode unit when the fourth encoded information is generated from the second information.

An example of the training process executed by the information providing apparatus 10 is explained below by using equations. For example, when the DSN is used as the first model, the information providing apparatus 10 corrects the connection coefficient between the nodes included in the first model so as to minimize the value of $L_{DSN}$ illustrated in the following Equation (1).

$$L_{DSN}=L_{task}+\alpha L_{recon}+\beta L_{difference}+\gamma L_{similarity} \quad (1)$$

Here, $L_{task}$ in Equation (1) is a classification loss in the DSN, and it is information indicating an error between the label (for example, whether the user indicated by the first information likes the content indicated by the second information, or the degree of certainty with which the user likes the content) that corresponds to the pair of the first information and the second information and the label indicated by the classification information. For example, the information providing apparatus 10 sets $L_{task}$ described in the following Equation (2). Here, $y_i$ described in Equation (2) represents the label that corresponds to the i-th pair of the first information and the second information input to the first model as supervised data, and $y_i$ with the hat symbol added thereto represents information output from the first model when the pair of the first information and the second information is input to the first model, i.e., information indicating the predicted label of the second information.

$$L_{task}=-\sum_{i=1}^{N_S} y_i \cdot \log(\hat{y}_i) \quad (2)$$

Furthermore, $L_{recon}$ in Equation (1) is a reconstruction error represented by the difference between the first information and the first decoded information that are input and the difference between the second information and the second decoded information that are input. For example, the information providing apparatus 10 sets $L_{recon}$ described in the following Equation (3). Here, $X_i^T$ described in Equation (3) denotes the i-th first information input as supervised data, and $X_i^T$ with the hat symbol added thereto denotes the first decoded information output from the first model when the first information indicated by $X_i^T$ is input as supervised data. Moreover, $X_i^S$ described in Equation (3) denotes the i-th second information input as supervised data, and $X_i^S$ with the hat symbol added thereto denotes the second decoded information output from the first model when the second information indicated by $X_i^S$ is input as supervised data.

$$L_{recon} = \sum_{i=1}^{N_S} \|x_i^S - \hat{x}_i^S\|^2 + \sum_{i=N_S+1}^{N_S+N_T} \|x_i^T - \hat{x}_i^T\|^2 \quad (3)$$

Furthermore, $L_{difference}$ in Equation (1) is a term that is set to train each encoder so as to extract a different type of feature from input information. For example, the information providing apparatus 10 sets the value of $L_{difference}$ described in the following Equation (4). Here, $H^t_C$ described in Equation (4) is a matrix based on the third encoded information $H^T_C$ extracted by the third encoder. Furthermore, $H^t_P$ described in Equation (4) is a matrix based on the first encoded information $H^T_P$ extracted by the first encoder. Further, $H^S_C$ described in Equation (4) is a matrix based on the fourth encoded information $H^S_C$ extracted by the third encoder. Moreover, $H^S_P$ described in Equation (4) is a matrix based on the second encoded information $H^S_P$ extracted by the second encoder.

$$L_{difference} = \|H_C^S H_P^{S^T}\|_F^2 + \|H_C^t H_P^T\|_F^2 \quad (4)$$

Furthermore, $L_{similarity}$ in Equation (1) is a term that is set for training such that the third encoded information generated from the first information by the third encoder and the fourth encoded information generated from the second information by the third encoder become similar (difficult to be differentiated). For example, the information providing apparatus 10 sets the value of $L_{similarity}$ described in the following Equation (5). Here, $d_i$ described in Equation (5) is a binary label indicating the domain of the i-th input supervised data, and $d_i$ with the hat symbol added thereto indicates the domain label predicted by the first model.

$$L_{similarity} = \sum_{i=1}^{N_S+N_T} [d_i \log \hat{d}_i + (1 - d_i) \log(1 - \hat{d}_i)] \quad (5)$$

Furthermore, when the second model is an autoencoder, the information providing apparatus 10 trains the second model such that, when the third information indicating content belonging to the second domain is input to the second model, the second model outputs information that is similar to the third information. For example, the information providing apparatus 10 corrects the value of a connection coefficient included in the second model such that the value of $L_{SDAS}$ illustrated in the following Equation (6) becomes small. Here, $x_i$ described in Equation (6) is information (e.g., metadata) indicating the content belonging to the second domain, and $x_i$ with the hat symbol added thereto denotes data output from the second model when $x_i$ is input to the second model.

$$L_{SDAE} = \sum_{i=1}^{n} \|x_i - \hat{x}_i\|^2 \quad (6)$$

Here, when the second model is trained by using the metadata on content belonging to the second domain as supervised data to reduce the value of $L_{SDAE}$ described in Equation (6), the second model may learn the feature of metadata on content belonging to the second domain (i.e., the feature of content belonging to the second domain). More specifically, when metadata on content belonging to the second domain is input as the third information, the second model extracts feature information indicating the feature of the third information and restores and outputs the original third information based on the extracted feature information.

On the other hand, the first model outputs a classification result indicating classification of the second information from the information that is the encoded second information, the second information being metadata on the content belonging to the first domain. That is, in the same manner as the second model, part of the first model extracts a feature of input information and outputs a classification result of the input information based on the extracted feature.

Here, it is assumed that, when the type of content belonging to the first domain is similar to the type of content belonging to the second domain, the second model may extract the feature of content belonging to the first domain with a certain accuracy. More specifically, it is considered that, when the second model is trained by using content belonging to the second domain, it may extract the feature of content belonging to the first domain in consideration of the feature of the content belonging to the second domain.

As a result, it is considered that, when the first model learns such that the feature extracted by the first model from the second information belonging to the first domain becomes similar to the feature extracted by the second model from the second information, the first model may learn the co-occurrence between the content and the user in consideration of the feature of content belonging to the second domain. Therefore, the information providing apparatus 10 trains the first model and the second model so that the value of E described in the following Equation (7) is minimized.

$$E = L_{DSN} + \lambda_{item} L_{item} + \lambda_{IR} L_{IR} \quad (7)$$

Here, $L_{DSN}$ described in Equation (7) is $L_{DSN}$ described in Equation (1). Furthermore, $L_{item}$ described in Equation (7) is a term for training the first model such that the feature of the second information extracted from the second information by the first model becomes similar to the feature of the second information extracted from the second information by the second model. For example, the information providing apparatus 10 sets the term described in the following Equation (8) as $L_{item}$. Here, $v_{yi}$ described in Equation (8) is a vector (i.e., a weight to softmax) output from a hidden layer previous to the output layer among the hidden layers included in the classifier of the first model when the i-th second information is input to the first model. That is, $v_{yi}$ described in Equation (8) is the feature information indicating the feature of the second information used when the classifier included in the first model classifies the second information. Furthermore, $h_i$ described in Equation (8) denotes a vector output from a hidden layer that outputs information with the smallest number of dimensions among the hidden layers included in the second model when the i-th second information is input to the second model.

$$L_{item} = \sum_{i=1}^{N_S} \|v_{y_i} - h_i\|^2 \quad (8)$$

Furthermore, $\lambda_{item}$ described in Equation (7) is a predetermined weight to $L_{item}$. Furthermore, $L_{IR}$ described in Equation (7) is a loss function indicating the difference between the second information input to the first model and the second model and the second information output from the second model. Further, $\lambda_{IR}$ described in Equation (7) is a predetermined weight to $L_{IR}$.

Specifically, the information providing apparatus 10 trains the first model such that the label that corresponds to the pair of the first information and the second information belonging to the first domain becomes similar to the label indicated by the classification information output from the first model. Furthermore, the information providing apparatus 10 trains the first model such that the difference between the first information and the first decoded information and the difference between the second information and the second decoded information becomes small. Furthermore, the information providing apparatus 10 trains the first model such that the first encoder, the second encoder, and the third encoder extract different features from the first information and the second information that are input. Further, the information providing apparatus 10 trains the first model such that the third encoded information generated from the first information by the third encoder becomes similar to the fourth encoded information generated from the second information by the third encoder. Further, the information providing apparatus 10 trains the first model such that the feature information generated from the second information by the second model becomes similar to the feature information generated from the second information by the first model. Moreover, in parallel to the above-described training of the first model, the information providing apparatus 10 trains the second model such that information similar to the second information is output when the second information is input to the second model.

Figure 2:
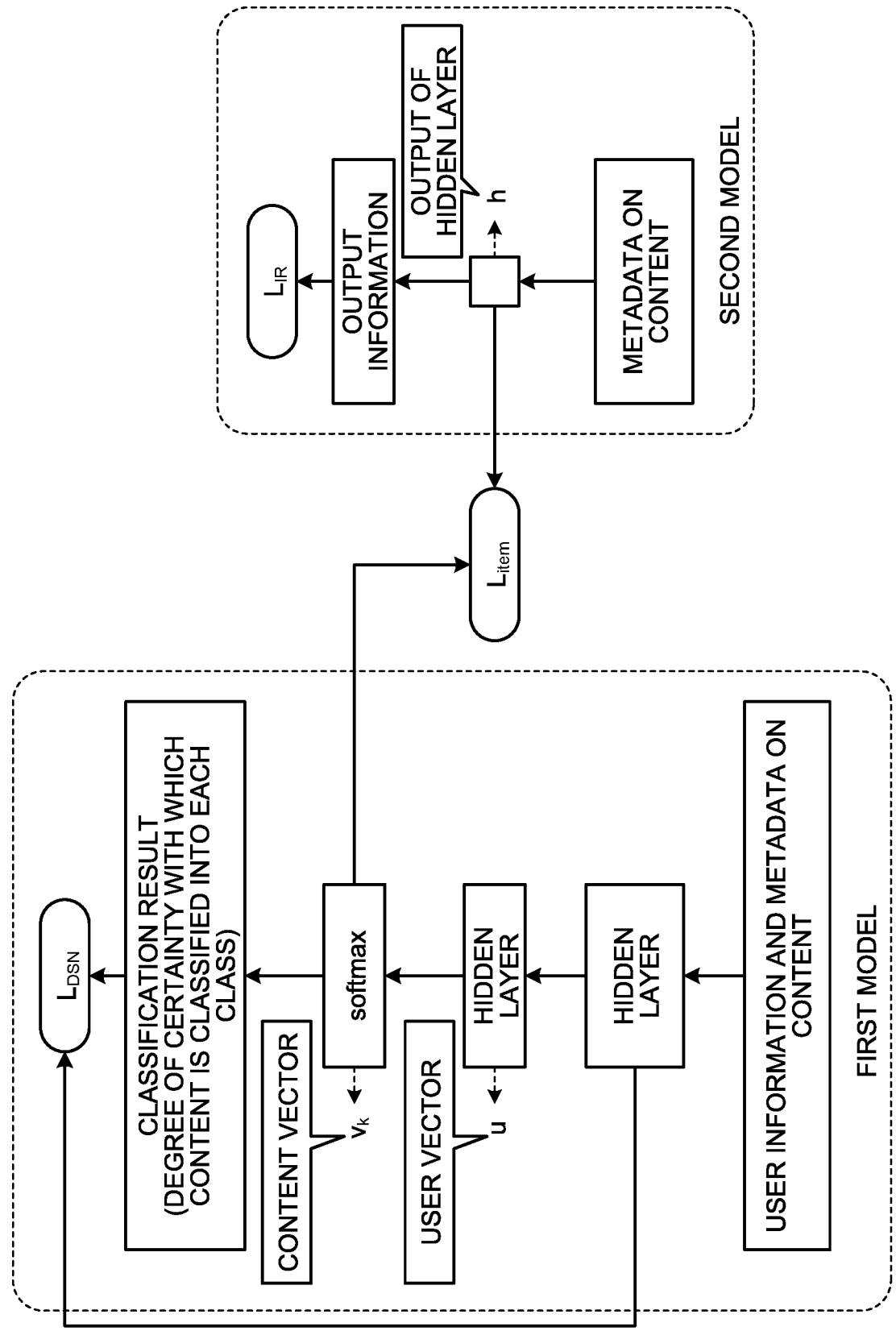
FIG. 2 is a diagram that illustrates an example of the concept of the architecture of a model according to the embodiment.

For example, FIG. 2 is a diagram that illustrates an example of the concept of the architecture of a model according to the embodiment. The example illustrated in FIG. 2 describes the concept of the architecture of the entire model configured by the first model and the second model illustrated in FIG. 1.

For example, when the user information and the metadata on content are input, the first model executes arithmetic processing with the hidden layers to generate a user vector u indicating the user information and generate a content vector $v_k$ indicating the feature of the content. Here, the content vector $v_k$ is information (i.e., information at the stage prior to softmax calculation) output from the hidden layer at the stage prior to the output layer among the hidden layers included in the classifier, and it corresponds to $v_{yi}$ illustrated in Equation (8). Furthermore, the user vector u is information output from the hidden layer at the stage prior to the layer that outputs the content vector $v_k$ among the hidden layers included in the classifier. Then, the first model outputs the degree of certainty with which the content is classified into each class based on the generated content vector $v_k$ as a classification result.

Furthermore, when the metadata on content is input, the second model compresses the dimensionality of the input information to generate feature information h indicating the feature of content and generates output information based on the generated feature information h. Then, the information providing apparatus 10 trains the first model and the second model such that the feature information h and the content vector $v_k$ become similar.

As a result of this training process, the information providing apparatus 10 may cause the first model to learn the co-occurrence between the first information and the second information belonging to the first domain in consideration of the feature of the third information belonging to the second domain. Furthermore, when the second information and the third information are of a similar type, it is considered that the co-occurrence between the first information and the second information in the first domain is similar to the co-occurrence between the first information and the third information in the second domain. Thus, the information providing apparatus 10 may obtain a model that is capable of estimating the co-occurrence between the first information and the third information in the second domain by executing the above-described training process even when there is little supervised data belonging to the second domain.

Furthermore, the information providing apparatus 10 causes the first model to learn the feature of the second information belonging to the first domain. Here, when the third information belonging to the second domain and the second information belonging to the first domain are of a similar type, it is assumed that the first model may extract the feature of information belonging to the second domain with a certain accuracy. As a result, even when the third information belonging to the second domain includes information different from the second information belonging to the first domain, the information providing apparatus 10 may classify information belonging to the second domain as it is capable of making classification based on the feature of the third information.

2. CONFIGURATION OF THE INFORMATION PROVIDING APPARATUS

Figure 3:
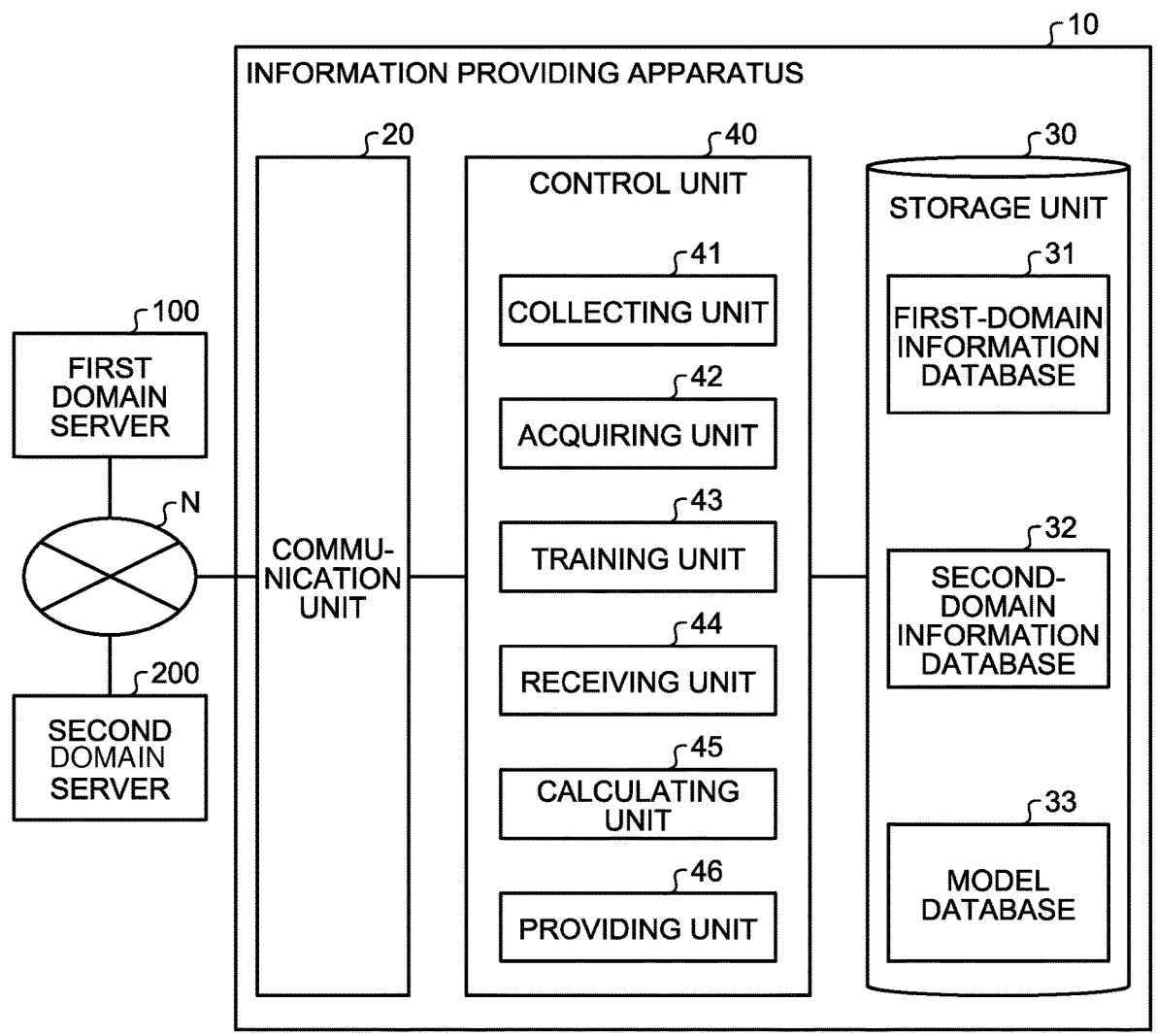
FIG. 3 is a diagram that illustrates an example of the functional configuration included in the information providing apparatus according to the embodiment.

Next, with reference to FIG. 3, an example of the functional configuration included in the information providing apparatus 10 is explained. FIG. 3 is a diagram that illustrates an example of the functional configuration included in the information providing apparatus according to the embodiment. A communication unit 20 is implemented by using, for example, NIC (Network Interface Card). Furthermore, the communication unit 20 is connected to the network N wired or wirelessly, and it transmits and receives information between the first domain server 100 and the second domain server 200.

A storage unit 30 is implemented by using, for example, a semiconductor memory device such as RAM or flash memory or a storage device such as hard disk or optical disk. Furthermore, the storage unit 30 stores a first-domain information database 31, a second-domain information database 32, and a model database 33.

The first-domain information database 31 has registered therein information belonging to the first domain. For example, FIG. 4 is a diagram that illustrates an example of information registered in the first-domain information database according to the embodiment. As illustrated in FIG. 4, the first-domain information database 31 has registered therein information including items "data ID (Identifier)", "domain information", "user information", and "content information".

Here, "data ID" is the identifier for identifying registered information. Furthermore, "domain information" is information indicating the domain to which information belongs. Furthermore, "user information" is information indicating the user having selected the content indicated by the related content information, and it is, for example, attribute information indicating the attribute of the user. Moreover, "content information" is information indicating the content that is selected by the user indicated by the related user information and that belongs to the domain indicated by the related domain information. For example, "content information" is metadata on content.

For example, in the example illustrated in FIG. 4, the first-domain information database 31 has registered therein the data ID "data #1-1", the domain information "domain #1", the user information "user #1", and the content information "content #1-1" in a related manner. This information indicates that the information indicated by the data ID "data #1-1" is information belonging to the domain indicated by the domain information "the domain #1" and it is the pair of the attribute information indicated by the user information "user #1" and the metadata indicated by the content information "content #1-1".

Although the example illustrated in FIG. 4 describes conceptual values such as "user #1" or "content #1-1", the first-domain information database 31 actually has registered therein various types of attribute information indicating an attribute of the user, metadata on content, or the like. Furthermore, the first-domain information database 31 may have registered therein any information other than the information illustrated in FIG. 4.

With reference back to FIG. 3, the second-domain information database 32 has registered therein information belonging to the second domain. For example, FIG. 5 is a diagram that illustrates an example of information registered in the second-domain information database according to the embodiment. As illustrated in FIG. 5, the second-domain information database 32 has registered therein information including items such as "data ID", "domain information", and "content information".

For example, in the example illustrated in FIG. 5, the second-domain information database 32 has registered therein the data ID "data #2-1", the domain information "domain #2", and the content information "content #2-1" in a related manner. This information indicates that the information indicated by the data ID "data #2-1" is information belonging to the domain indicated by the domain information "domain #2" and it includes the metadata indicated by the content information "content #2-1".

Here, although the example illustrated in FIG. 5 describes conceptual values such as "content #2-1", the second-domain information database 32 actually has registered therein metadata on content, and the like. Also, the second-domain information database 32 may have registered therein any information other than the information illustrated in FIG. 5.

With reference back to FIG. 3, the model database 33 has registered therein models including the first model and the second model (hereafter, sometimes referred to as "learning model").

For example, the model database 33 has registered therein data on a learning model including: an input layer to which input information is input, the information being input to the learning model; a plurality of intermediate layers (hidden layers) that sequentially perform a predetermined process on the input information that has been input to the input layer; and an output layer that generates output information that corresponds to the input information based on output of the intermediate layer. More specifically, the model database 33 has registered therein data indicating the connection relation of each node and the connection coefficient between nodes.

Here, the learning model includes: a first element belonging to a layer that is any layer between the input layer and the output layer and that is other than the output layer; and a second element that calculates a value based on the first element and a weight to the first element, and the learning model causes the computer to function so as to, with regard to information that is input to the input layer, perform a calculation based on the first element and a weight to the first element, where the first element is each element belonging to each layer other than the output layer, and cause the output layer to output the information that corresponds to the information input to the input layer. Here, it may be assumed that the learning model is used as a program module that is part of artificial intelligence software.

For example, the model database 33 has registered therein a learning model including the first model and the second model having the architecture illustrated in FIG. 1. For example, the model database 33 has registered therein the first model including: the first encoder that includes a plurality of intermediate layers and encodes the first information to generate the first encoded information; the second encoder that includes a plurality of intermediate layers and encodes the second information to generate the second encoded information; and the third encoder that includes a plurality of intermediate layers, encodes the first information to generate the third encoded information, and encodes the second information to generate the fourth encoded information. Furthermore, the model database 33 has registered therein the first model including the decoder that includes a plurality of intermediate layers, generates the first decoded information from the first encoded information and the third encoded information, and generates the second decoded information from the second encoded information and the fourth encoded information. Further, the model database 33 has registered therein the first model including the classifier that includes a plurality of intermediate layers and generates classification information indicating a classification result of the second information corresponding to the first information from the fourth encoded information. Also, the model database 33 has registered therein the second model that includes a plurality of intermediate layers and generates feature information indicating the feature of input information.

This learning model is trained such that, when the first information and the second information are input to the input layer of the first model and the second information is input to the input layer of the second model, the output layer of the first model outputs the first encoded information similar to the first information, the second encoded information similar to the second information, and the classification information indicating classification of the second information corresponding to the first information. Furthermore, the learning model is trained such that the intermediate information based on the second information output from the intermediate layer included in the classifier becomes similar to the feature information output from the intermediate layer of the second model.

This learning model causes the computer to function such that, when the first information and the third information are input to the input layer of the first model, classification information indicating classification of the third information corresponding to the first information is output. For example, the learning model is used for a computer including a CPU and a memory. Specifically, the CPU of the computer operates such that, in accordance with commands from the learning model stored in the memory, calculations are performed on information input to the input layer of the learning model based on a trained weighting coefficient, a response function, or the like, in the neural network so that the output layer outputs the output information that corresponds to the input information.

For example, the learning model causes the computer to function such that, when the first information (e.g., the attribute information on the user) indicating the user who uses a service belonging to the second domain and the second information (e.g., the metadata on content) indicating the content belonging to the second domain are input to the input layer of the first model, a classification result of the second information corresponding to the first information is output. That is, the learning model includes: the input layer that takes in the first information indicating the user who uses a service belonging to the second domain and the second information indicating content belonging to the second domain; the output layer; the first element belonging to a layer that is any of the layers between the input layer and the output layer and that is other than the output layer; and the second element that calculates a value based on the first element and a weight applied to the first element, and the learning model causes the computer to function such that, with regard to the first information and the second information input to the input layer, a calculation is performed based on the first element and a weight applied to the first element, where the first element is each element belonging to each layer other than the output layer, and a classification result of the second information corresponding to the first information is output. For example, the learning model outputs, as a classification result, a numerical value, or the like, indicating whether the user having the input attribute information likes the content that corresponds to the input metadata or the degree of certainty with which the user likes the content.

Here, when the learning model is implemented by using a neural network including one or more intermediate layers, such as a DNN, it may be considered that the first element included in the learning model is any node included in the input layer or the intermediate layer, the second element corresponds to the node, i.e., the subsequent node, to which the node corresponding to the first element transmits a value, and a weight to the first element is a weight, i.e., a connection coefficient, applied to the value transmitted from the node corresponding to the first element to the node corresponding to the second element.

Here, the information providing apparatus 10 generates a learning model by using information registered in the first-domain information database 31 and the second-domain information database 32. Specifically, the learning model is a model that includes the second model that has learnt the feature of the third information belonging to the second domain and that has learnt such that, when the first information and the second information belonging to the first domain are input to the first model and the second information belonging to the first domain is input to the second model, the first model outputs a classification result of the second information corresponding to the first information and the information output from a predetermined layer among the intermediate layers included in the first model becomes close to the feature information indicating the feature of the second information extracted from the second information by the second model.

In this way, the learning data registered in the first-domain information database 31 and the second-domain information database 32 are data that include: the input layer to which the first information and the second information are input; the output layer; the first element that belongs to a layer that is any of the layers between the input layer and the output layer and that is other than the output layer; and the second element that calculates a value based on the first element and a weight applied to the first element, and the learning data causes the computer to function such that a calculation is performed based on the weight to which the features of the first information and the second information are applied so that the output information (e.g., a classification result of the second information corresponding to the first information) that corresponds to the input first information and second information are output from the output layer.

Furthermore, the information providing apparatus 10 may calculate a classification result by using a model having any architecture, such as the above-described neural network. Specifically, the learning model may include the second model having learnt the feature of the third information belonging to the second domain and has been trained such that, when the first information and the second information belonging to the first domain are input to the first model, a classification result of the second information corresponding to the first information is output, and the intermediate information generated from the first information and the second information by the first model becomes similar to the feature information indicating the feature of the second information output from the intermediate layer of the second model when the second information is input to the second model. Furthermore, the learning model may output a classification result of the third information when the third information belonging to the second domain is input.

Here, for the learning model, coefficients are set such that, when the first information and the third information are input, a classification result of the third information corresponding to the first information is output. By using this learning model, the information providing apparatus 10 obtains a classification result of the third information that corresponds to the first information.

In the example described above, the learning model is a model (hereafter, referred to as model X) that outputs a classification result of the third information that corresponds to the first information when the first information and the third information are input. However, the learning model according to the embodiment may be a model generated based on results obtained from repeated input/output of data to/from the model X. For example, the learning model may be a model (model Y) that is trained such that input is the first information indicating the attribute information of the user and the third information indicating the metadata on content and output is a classification result of the third information output from the model X. Furthermore, the learning model may be a model that is trained such that input is the first information and the third information and output is a value output from the model Y.

Furthermore, when the information providing apparatus 10 performs a training process by using GAN (Generative Adversarial Networks), the learning model may be a model that forms part of the GAN.

A control unit 40 is a controller, and it is implemented when a processor such as a CPU (Central Processing Unit) or MPU (Micro Processing Unit) executes various programs stored in a storage device within the information providing apparatus 10 with a RAM, or the like, as a work area. Also, the control unit 40 is a controller, and it may be implemented by using, for example, an integrated circuit such as an ASIC (Application Specific Integrated Circuit) or an FPGA (Field Programmable Gate Array).

Furthermore, the control unit 40 executes the learning model stored in the storage unit 30 so that calculations are performed on the first information and the third information input to the input layer of the learning model based on a coefficient provided in the learning model (i.e., the coefficient that corresponds to each feature learnt by the learning model) and classification information indicating a classification result of the third information that corresponds to the input first information is generated and is output from the output layer of the learning model.

As illustrated in FIG. 3, the control unit 40 includes a collecting unit 41, an acquiring unit 42, a training unit 43, a receiving unit 44, a calculating unit 45, and a providing unit 46. The collecting unit 41 collects supervised data used for training a model. More specifically, the collecting unit 41 collects a pair of the first information and the second information associated with the first information belonging to the first domain. Also, the collecting unit 41 collects the second information that is of the same type as the second information and that belongs to the third domain different from the first domain.

For example, the collecting unit 41 collects, from the first domain server 100, the metadata on content belonging to the first domain as the second information and the attribute information on the user having selected the content including the metadata indicated by the second information as the first information. Then, the collecting unit 41 registers the first information and the second information collected in the first-domain information database 31. Furthermore, the collecting unit 41 collects, from the second domain server 200, the metadata on content belonging to the second domain as the third information. Then, the collecting unit 41 registers the collected third information in the second-domain information database 32.

The acquiring unit 42 acquires a learning model. For example, the acquiring unit 42 acquires a learning model registered in the model database 33 when a notification for executing a training process is received from the training unit 43. Here, the acquiring unit 42 may generate a model when no model is registered in the model database 33. That is, "acquisition" described below is the idea that includes not only a process to acquire data on a model registered in a memory area but also a process to acquire a model by generating data on the model.

For example, the acquiring unit 42 acquires a model configured by a DNN as the learning model. For example, the acquiring unit 42 acquires a learning model including the first model and the second model. More specifically, the acquiring unit 42 acquires the first model including: an input layer to which input information is input; a plurality of intermediate layers that performs calculations based on the feature of the input information that has been input; and an output layer that outputs the output information that corresponds to output of the intermediate layer.

More specifically, the acquiring unit 42 acquires, as the first model, the first model including the first encoder that outputs the first encoded information by encoding the first information when the first information is input. Furthermore, the acquiring unit 42 acquires the first model including the second encoder that outputs the second encoded information by encoding the second information when the second information is input. Further, the acquiring unit 42 acquires the first model including the third encoder that outputs the third encoded information by encoding the first information and the fourth encoded information by encoding the second information when the first information and the second information are input. Also, the acquiring unit 42 acquires the first model including the decoder that generates the first decoded information from the first encoded information and the third encoded information and generates the second decoded information from the second encoded information and the fourth encoded information. Moreover, the acquiring unit 42 acquires the first model including the classifier that includes a plurality of intermediate layers and generates classification information indicating a classification result of the second information from the fourth encoded information.

Furthermore, the acquiring unit 42 acquires the learning model including the second model having learnt the feature of the third information. For example, the acquiring unit 42 acquires, as the second model, the model that has previously learnt the feature of the third information that is of the same type as the second information. For example, the acquiring unit 42 generates an autoencoder as the second model and causes the generated second model to learn the feature of the third information. More specifically, the acquiring unit 42 inputs content information (i.e., metadata on content) registered in the second-domain information database 32 as the third information to the second model and corrects a connection coefficient included in the second model by using a training technique, such as back propagation, such that output of the second model becomes similar to the input third information. As a result, the acquiring unit 42 may acquire the second model having learnt the feature of the third information belonging to the second domain. Then, the acquiring unit 42 provides the training unit 43 with the first model and the second model.

The training unit 43 generates the learning model and stores the generated learning model in the model database 33 of the storage unit 30. For example, the training unit 43 trains the learning model by correcting a connection coefficient included in the learning model such that, when the first information and the second information belonging to the first domain are input to the first model, the first model outputs classification information indicating a classification result of the second information corresponding to the first information and information output from a predetermined intermediate layer included in the first model (e.g., a predetermined intermediate layer among the intermediate layers included in the classifier) becomes similar to the feature information output from a predetermined intermediate layer included in the second model (e.g., the intermediate layer that outputs information having the fewest dimensions) when the second information is input to the second model.

Furthermore, the training unit 43 may train a learning model by using any training algorithm. For example, the training unit 43 may generate a learning model by using a training algorithm such as neural network, support vector machine, clustering, or reinforcement learning. For example, when the training unit 43 generates a learning model by using a neural network, the learning model includes: an input layer including one or more neurons; an intermediate layer including one or more neurons; and an output layer including one or more neurons. Then, the training unit 43 trains the learning model by correcting the connection coefficient included in the learning model by using information registered in the first-domain information database 31.

For example, the training unit 43 trains the first model such that, when predetermined input information is input to the first model, the first model outputs predetermined output information that corresponds to the predetermined input information and the intermediate information output from a predetermined intermediate layer among the intermediate layers becomes close to the feature information that corresponds to the feature of the correspondence information that corresponds to the predetermined input information. For example, the training unit 43 trains the first model such that, when input information related to the first domain is input as the predetermined input information to the first model, the information indicating classification of the input information is output as output information and the intermediate information becomes close to the feature information that takes account of the correspondence information related to the second domain different from the first domain.

Furthermore, the training unit 43 trains the first model such that, when the first information and the second information associated with the first information are input as predetermined input information to the first model, a classification result of the second information is output as output information and the intermediate information becomes close to the feature information that corresponds to the feature of the second information and that takes account of the feature of the third information associated with the first information. Moreover, the training unit 43 trains the first model by using the first information and the second information belonging to the first domain and the third information belonging to the second domain different from the first domain.

For example, the training unit 43 trains the first model by using the first information indicating the feature of the user, the second information indicating the selection target selected by the user having the feature indicated by the first information, and the third information indicating the selection target different from the selection target indicated by the second information. Furthermore, the training unit 43 trains the first model such that the intermediate information becomes close to the feature information generated from the second information by the second model. Further, the training unit 43 trains the first model such that, when the first information and the second information are input to the first model, the information indicating classification of the second information is output as output information and the intermediate information becomes close to the feature information generated by the second model when the second information is input to the second model. Moreover, the training unit 43 trains the first model such that the first information and the first decoded information become similar, the second information and the second decoded information become similar, and information output from a predetermined intermediate layer among the intermediate layers included in the classifier becomes close to the feature information.

An example of the training process executed by the training unit 43 is explained below. First, the training unit 43 gives a command to the acquiring unit 42 so as to acquire a learning model at predetermined timing for executing the training process. In such a case, the acquiring unit 42 acquires the first model including the first encoder, the second encoder, the third encoder, the decoder, and the classifier described above, and the second model having learnt the feature of content information registered in the second-domain information database 32, i.e., the second model having learnt the feature of the third information belonging to the second domain, and provides the training unit 43 with the first model and the second model that have been acquired.

Then, the training unit 43 acquires the pair of the first information and the second information as supervised data from the first-domain information database 31. Specifically, the training unit 43 acquires, as the first information, the user information on the user having selected content belonging to the first domain and acquires, as the second information, the content information on the content selected by the user indicated by the user information acquired as the first information. Then, the training unit 43 inputs the first information and the second information to the first model and inputs the second information to the second model. For example, the training unit 43 inputs the first information to the first encoder and the third encoder included in the first model, inputs the second information to the second encoder and the third encoder, and inputs the second information to the second model.

Here, when the first information and the second information are input, the first model generates the first encoded information from the first information, generates the second encoded information from the second information, and generates the third encoded information and the fourth encoded information from the first information and the second information. Furthermore, the first model generates the first decoded information based on the first encoded information and the third encoded information and generates the second encoded information based on the second encoded information and the fourth encoded information. Further, the first model generates classification information based on the fourth encoded information. Also, the second model generates the feature information indicating the feature of the second information from the second information.

Then, the training unit 43 trains the learning model such that the first decoded information and the first information become similar, the second decoded information and the second information become similar, classification information becomes similar to a classification result of the second information corresponding to the first information, and intermediate information output from a predetermined intermediate layer included in the first model becomes similar to the feature information generated by the second model. For example, the training unit 43 trains the learning model by correcting a connection coefficient included in the first model so as to minimize the above-described Equation (7). Then, the training unit 43 registers the trained learning model in the model database 33.

As a result of the above training process, the learning model learns the relationship between the first information and the second information in consideration of the feature of the third information belonging to the second domain. Here, as the second information and the third information belong to the same class, the learning model indirectly learns the relationship between the first information and the third information. Accordingly, the learning model may learn the relationship between the first information and the third information even when there is little amount of the first information and the third information as supervised data. Furthermore, even though the third information belonging to the second domain contains information that is not common to the second information belonging to the first domain, the learning model may classify the third information corresponding to the first information as it is trained in consideration of the feature of the third information.

The receiving unit 44 receives a request to execute an estimation process using the learning model. For example, the second domain server 200 acquires the user information on the user who has accessed the second domain and transmits the acquired user information together with the request to execute an estimation process to the receiving unit 44. In such a case, the receiving unit 44 outputs the user information received from the second domain server 200 to the calculating unit 45.

The calculating unit 45 performs calculations by using the learning model to execute an estimation process to estimate a classification result of the third information corresponding to the first information. For example, the calculating unit 45 reads a learning model registered in the model database 33. Then, the calculating unit 45 inputs the user information received from the second domain server 200 as the first information and the content information registered in the second-domain information database 32 as the third information to the learning model so as to acquire a classification result of the third information corresponding to the first information. For example, the calculating unit 45 generates classification information that corresponds to the user information received from the second domain server 200 with regard to each piece of content information registered in the second-domain information database 32.

Specifically, the calculating unit 45 inputs the information on the user and the information on content belonging to the second domain to the input layer of the learning model due to information processing in accordance with the learning model. Then, the calculating unit 45 propagates the input information to the intermediate layers and the output layer so that the output layer outputs a classification result of the content that corresponds to the information on the user (e.g., the information indicating whether the user likes the content, or the degree of certainty with which the user likes the content). That is, the calculating unit 45 inputs the information on the user and the information on content to the learning model, thereby estimating classification of the content that corresponds to the user.

For example, the calculating unit 45 inputs the user information received from the second domain server 200 as the first information to the first encoder and the third encoder of the first model and inputs the content information on the content belonging to the second domain as the third information to the second encoder and the third encoder. Then, the calculating unit 45 acquires classification information output from the classifier of the learning model.

The providing unit 46 provides a classification result acquired by the calculating unit 45. For example, the providing unit 46 provides the second domain server 200 with a classification result of each piece of content belonging to the second domain estimated by the calculating unit 45. As a result, for example, the second domain server 200 may provide the user with information on the content which it is estimated the user likes more with a higher priority.

3. MODIFICATION

An example of the training process and the estimation process by the information providing apparatus 10 is explained above. However, the embodiment is not limited thereto. Variations of the training process and the estimation process are explained below.

3-1. With Regard to Model Architecture

In the above explanation, the information providing apparatus 10 trains the learning model including the first model and the second model and executes an estimation process by using the learning model. However, the embodiment is not limited thereto. For example, the information providing apparatus 10 may treat the first model and the second model as individual models. For example, the information providing apparatus 10 may use the first model as a learning model and train the learning model by using the second model. Furthermore, the information providing apparatus 10 may use only the first model to execute the above-described estimation process.

Furthermore, the information providing apparatus 10 may use the first model having any architecture other than the architecture of the DSN as a learning model. For example, the information providing apparatus 10 generates a neural network having any architecture, such as DNN, CNN, RNN, or LSTM, as the first model. More specifically, the information providing apparatus 10 generates the first model including: the input layer to which the first information and the second information are input; the intermediate layers; and the output layer that outputs a classification result of the second information corresponding to the first information. Then, the information providing apparatus 10 may train the first model such that, when the first information and the second information are input to the first model, the first model outputs classification information on the second information corresponding to the first information and output of a predetermined intermediate layer included in the first model becomes similar to the feature information on the second information.

Here, the information providing apparatus 10 may train the first model such that the intermediate information becomes similar to the feature information, the intermediate information being output from any intermediate layer in the first model having any architecture. For example, the information providing apparatus 10 may use, as the intermediate information, information output from an intermediate layer to which both information based on the first information (e.g., the value output from a node to which the value based on the first information is transmitted) and information based on the second information (e.g., the value output from a node to which the value based on the second information is transmitted) are transmitted, i.e., the intermediate layer that outputs a value based on the first information and the second information.

Furthermore, the information providing apparatus 10 may use any information as feature information as long as the information takes account of the feature of the third information. For example, the information providing apparatus 10 may train the first model by using feature information that is previously generated from each piece of content belonging to the third domain by using any technique. For example, when the first model is trained by using the content information on the content belonging to the first domain as the second information, the information providing apparatus 10 identifies the content in the second domain similar to the content and acquires the information indicating the feature of the identified content as feature information. Then, for training of the first model, the information providing apparatus 10 may train the first model such that intermediate information output from the first model becomes similar to the acquired feature information.

Here, when the learning model is trained by using Equation (7), training is executed such that each piece of decoded information output from the first model becomes similar to the first information and the second information that have been input. If this kind of training is conducted, the relationship between the first information and the second information learnt by the first model may be ensured to some extent. Therefore, the information providing apparatus 10 may train the first model such that the intermediate information becomes similar to the feature information indicating the feature of any third information.

Furthermore, in consideration of cross-domain recommendation, the information on content belonging to the second domain is the information indicating content that may be selected by the user who has received a service belonging to the first domain. Therefore, it can be said that the third information is information that is associated with the first information and belongs to a domain different from that of the first information. Thus, the information providing apparatus 10 may train the first model by using feature information indicating the feature of any information depending on a use purpose of the learning model as long as the information is associated with the first information.

That is, the information providing apparatus 10 may use a model having any architecture as the first model as long as the first model includes: the input layer to which input information is input; the plurality of intermediate layers that performs calculations based on the feature of the input information that has been input; and the output layer that outputs the output information that corresponds to output of the intermediate layer. Moreover, the information providing apparatus 10 may use any training technique as long as the first model is trained such that, when predetermined input information is input to the first model, the first model outputs predetermined output information that corresponds to the predetermined input information and the intermediate information output from a predetermined intermediate layer among the intermediate layers becomes close to the feature information that corresponds to the feature of correspondence information that corresponds to the predetermined input information.

3-2. Architecture of the First Model

In the above explanation, the information providing apparatus 10 trains the learning model such that, when user information and content information are input, the classification information is output which indicates whether the user indicated by the user information likes the content indicated by the content information or the degree of certainty with which the user likes it. However, the embodiment is not limited thereto.

Figure 6:
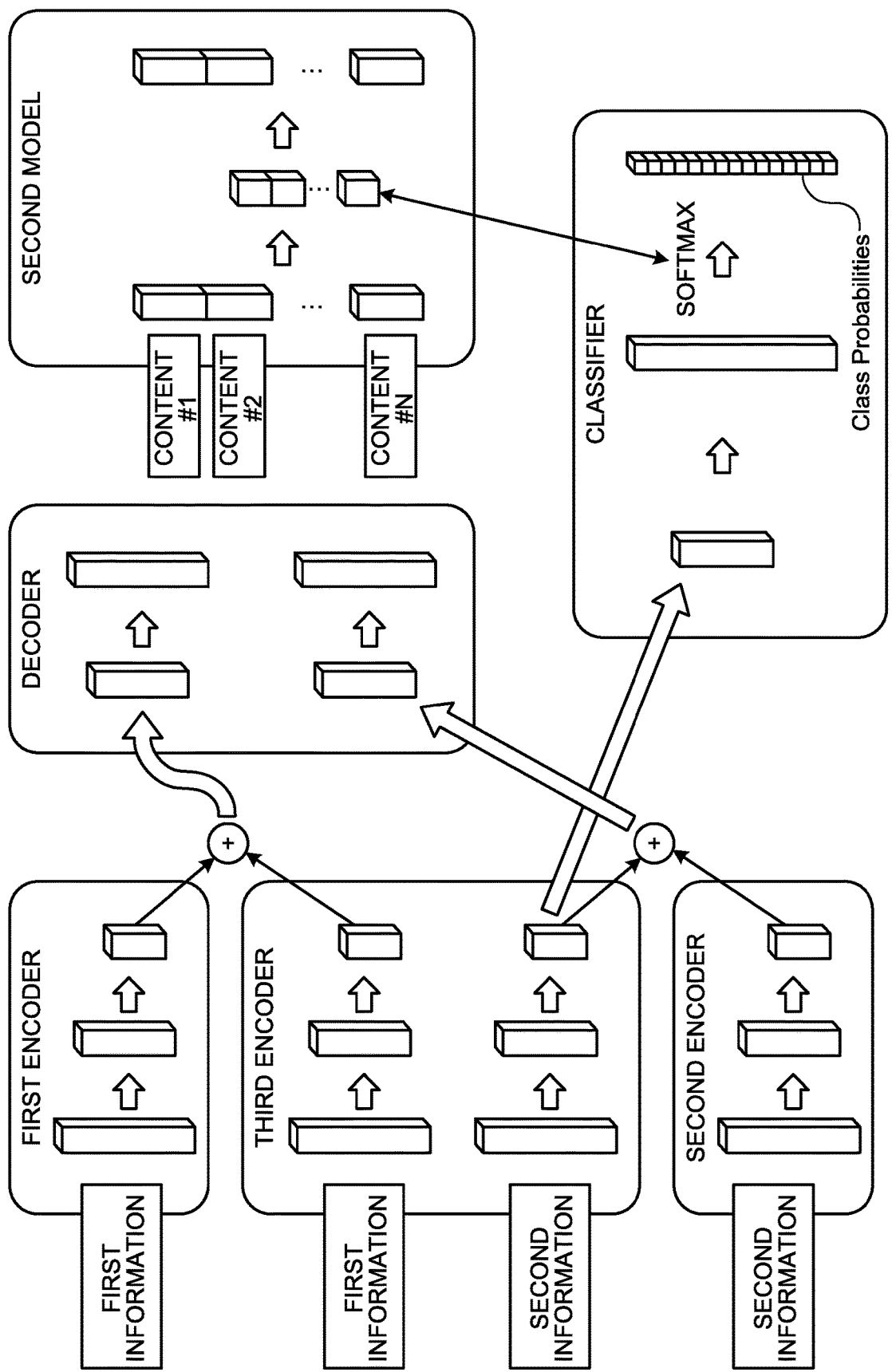
FIG. 6 is a diagram that illustrates a variation of the learning model generated by the information providing apparatus according to the embodiment.

For example, FIG. 6 is a diagram that illustrates a variation of the learning model generated by the information providing apparatus according to the embodiment. Basically, in the same manner as the learning model illustrated in FIG. 1, the learning model illustrated in FIG. 6 includes a first model including encoders, a decoder, and a classifier, and a second model. Here, in the example illustrated in FIG. 6, the information providing apparatus 10 causes the second model to learn the feature that is commonly owned by each piece of content belonging to the second domain and, by making the feature information output from the second model similar to the intermediate information generated by the classifier, causes the first model to learn the feature that is commonly owned by each piece of content belonging to the second domain.

For example, the information providing apparatus 10 trains the second model such that the metadata on each piece of content belonging to the second domain is input to an input layer of the second model in parallel, the dimensionality of the input metadata on each piece of content is reduced, and then the original metadata is restored. As a result of this training process, the second model extracts the feature that is commonly owned by each piece of content belonging to the second domain.

Then, the information providing apparatus 10 conducts training such that the intermediate information generated by the classifier in the first model becomes close to the feature information, the feature information being the feature commonly owned by each piece of content belonging to the second domain. Specifically, the information providing apparatus 10 trains the first model so as to minimize the difference between the intermediate information generated by the classifier in the first model and the feature information indicating the feature that is commonly owned by each piece of content belonging to the second domain. As a result of this processing, the information providing apparatus 10 may cause the learning model to learn the relationship between the content belonging to the first domain and the user in consideration of the feature of content belonging to the second domain.

3-3. Estimation Process

Here, to estimate content that corresponds to the user among pieces of content belonging to the second domain, the information providing apparatus 10 may make estimation by using the entire learning model or may make estimation by using an estimation model generated from part of the learning model. For example, when the learning model is trained during the above-described training process, the information providing apparatus 10 extracts the second encoder, the third encoder, and the classifier from the learning model and generates an estimation model including the second encoder, the third encoder, and the classifier that have been extracted. Then, to execute an estimation process, the information providing apparatus 10 inputs the user information as the first information and the metadata on content belonging to the second domain as the second information to the second encoder and the third encoder in the estimation model, thereby estimating a classification result of the second information corresponding to the first information.

3-4. Delivered Target

In the example described above, the information providing apparatus 10 delivers content belonging to the first domain or the second domain. Here, the target delivered by the information providing apparatus 10 may be content such as moving images, music, or Web pages, or the delivered target may be content related to advertisement.

For example, the information providing apparatus 10 may use information on advertisement (hereafter, referred to as "advertisement information") selected by the user during browsing on a Web page belonging to the first domain as the second information and advertisement information on the advertisement delivered during browsing on a Web page belonging to the second domain as the third information. Then, the information providing apparatus 10 executes the training process and the estimation process described above to estimate the advertisement that is likely to be selected by the user during browsing on the Web page belonging to the second domain and sets the estimated advertisement as the delivered target.

Furthermore, content belonging to the first domain and content belonging to the second domain may be different types of content. For example, when content belonging to the first domain is a news story, content belonging to the second domain may be a moving image. Moreover, the information providing apparatus 10 may use the data itself on the target content to be delivered as the second information or the third information.

3-5. Others

Furthermore, among the processes described in the above embodiment, all or some of the processes that are automatically performed as described above may be performed manually, and conversely all or some of the processes that are manually performed as described above may be performed automatically by using a well-known method. Moreover, operation procedures, specific names, and information including various types of data and parameters as described in the above specifications and the drawings may be optionally changed except as otherwise noted. For example, various types of information illustrated in each drawing are not limited to the information illustrated.

Furthermore, the components of each device illustrated are functionally conceptual and do not necessarily need to be physically configured as illustrated in the drawings. That is, specific forms of separation and combination of each device are not limited to those depicted in the drawings, and a configuration may be such that all or some of them are functionally or physically separated or combined in any unit depending on various types of loads, usage, or the like.

Furthermore, the embodiments described above may be appropriately combined while ensuring consistency in processing details.

4. EXAMPLE OF THE FLOW OF A PROCESS PERFORMED BY THE INFORMATION PROVIDING APPARATUS

Figure 7:
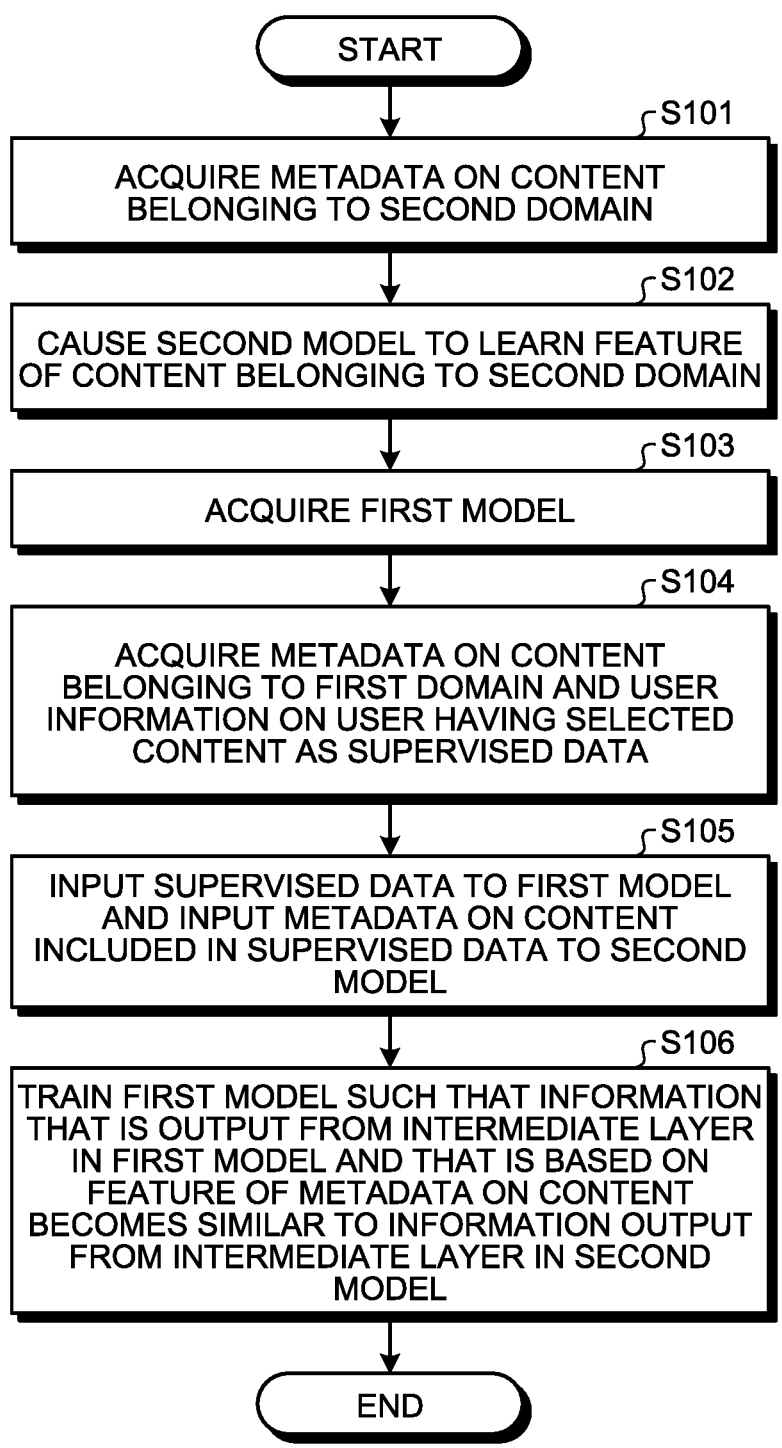
FIG. 7 is a flowchart that illustrates an example of the flow of a training process performed by the information providing apparatus according to the embodiment.

Next, with reference to FIG. 7, an example of the flow of a process performed by the information providing apparatus 10 is explained. FIG. 7 is a flowchart that illustrates an example of the flow of a training process performed by the information providing apparatus according to the embodiment.

For example, the information providing apparatus 10 acquires the metadata on content belonging to the second domain (Step S101) and causes the second model to learn the feature of the content belonging to the second domain (Step S102). For example, the information providing apparatus 10 trains the second model, which is an autoencoder, by correcting a connection coefficient provided in the second model such that, after the metadata on content belonging to the second domain is input to the second model, the dimensionality of the input metadata is reduced and then the original metadata is restored.

Then, the information providing apparatus 10 acquires the first model (Step S103) and acquires the metadata on content belonging to the first domain and the user information on the user having selected the content as supervised data (Step S104). Further, the information providing apparatus 10 inputs the supervised data to the first model and inputs the metadata on the content included in the supervised data to the second model (Step S105). Then, the information providing apparatus 10 trains the first model such that information (i.e., intermediate information) that is output from the intermediate layer in the first model and that is based on the feature of the metadata on the content becomes similar to information (i.e., feature information) output from the intermediate layer in the second model (Step S106), and then terminates the process.

5. PROGRAM

Figure 8:
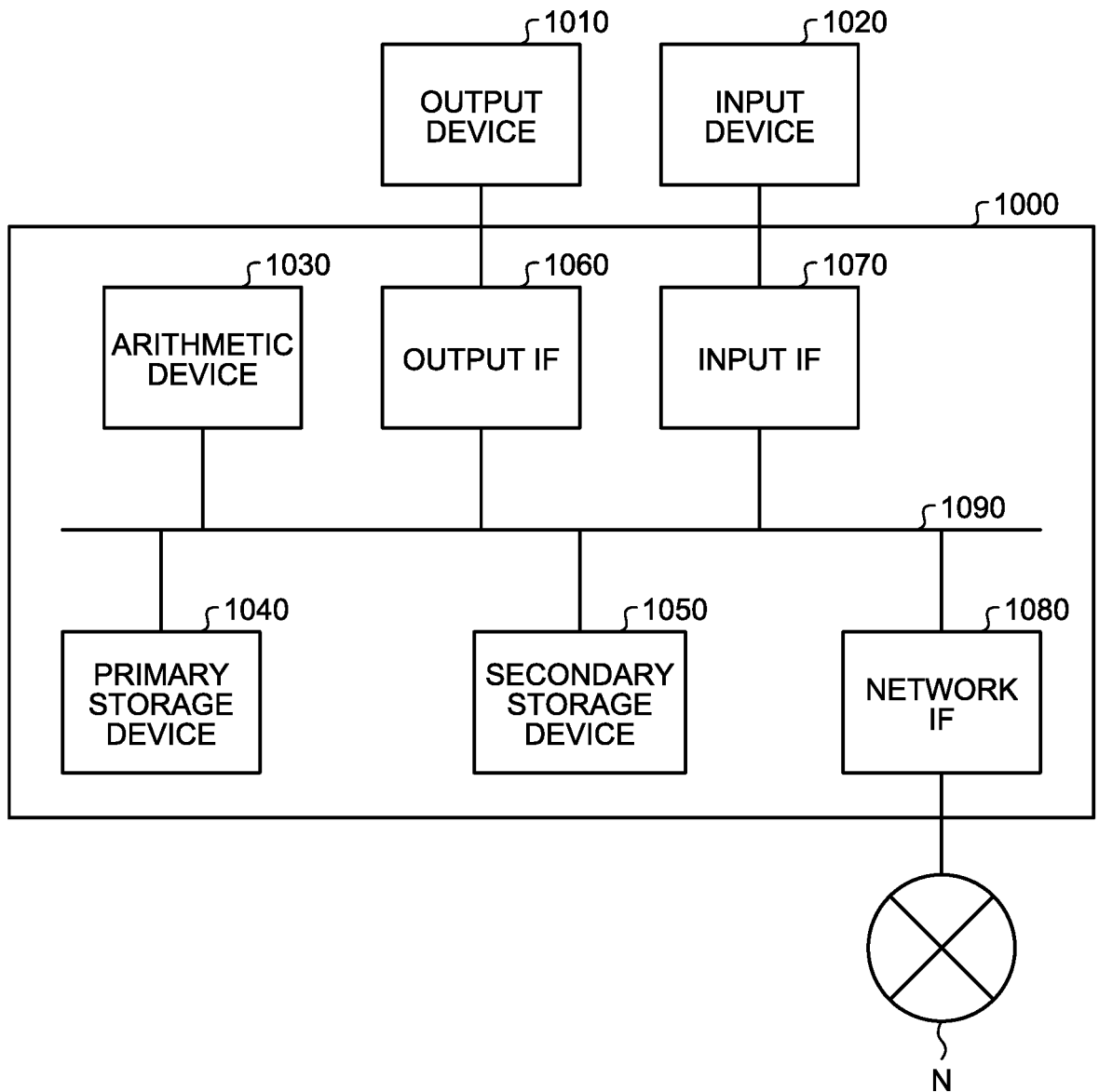
FIG. 8 is a diagram that illustrates an example of the hardware configuration.

The information providing apparatus 10 according to the above-described embodiment is implemented by using a computer 1000 having the configuration illustrated in, for example, FIG. 8. FIG. 8 is a diagram that illustrates an example of the hardware configuration. The computer 1000 is configured such that it is connected to an output device 1010 and an input device 1020, and an arithmetic device 1030, a primary storage device 1040, a secondary storage device 1050, an output IF (Interface) 1060, an input IF 1070, and a network IF 1080 are coupled via a bus 1090.

The arithmetic device 1030 operates on the basis of programs stored in the primary storage device 1040 or the secondary storage device 1050, programs read from the input device 1020, and the like, and performs various types of processing. The primary storage device 1040 is a memory device, such as RAM, which temporarily stores data used for the arithmetic device 1030 to perform various calculations. Furthermore, the secondary storage device 1050 is a storage device that has registered therein data used for the arithmetic device 1030 to perform various calculations or various databases, and it is implemented by using a ROM (Read Only Memory), HDD (Hard Disk Drive), flash memory, or the like.

The output IF 1060 is an interface that transmits the target information to be output to the output device 1010 that outputs various types of information to a monitor or a printer, and it is implemented by using a connector having a standard such as USB (Universal Serial Bus), DVI (Digital Visual Interface), or HDMI (High Definition Multimedia Interface) (registered trademark). Furthermore, the input IF 1070 is an interface that receives information from the various input devices 1020, such as mouse, keyboard, or scanner, and it is implemented by using, for example, USB.

Furthermore, the input device 1020 may be a device that reads information from, for example, an optical recording medium, such as a CD (Compact Disc), DVD (Digital Versatile Disc), PD (Phase-change-rewritable Disk), magneto-optical recording medium, such as MO (Magneto-Optical disk), tape medium, magnetic recording medium, or semiconductor memory. Moreover, the input device 1020 may be an externally connected storage medium such as USB memory.

The network IF 1080 receives data from a different device via the network N and transmits it to the arithmetic device 1030 or transmits data generated by the arithmetic device 1030 to a different device via the network N.

The arithmetic device 1030 controls the output device 1010 and the input device 1020 through the output IF 1060 and the input IF 1070. For example, the arithmetic device 1030 loads a program from the input device 1020 or the secondary storage device 1050 into the primary storage device 1040 and executes the loaded program.

For example, when the computer 1000 functions as the information providing apparatus 10 according to the embodiment, the arithmetic device 1030 of the computer 1000 executes a program or data (e.g., learning model) loaded into the primary storage device 1040 or the secondary storage device 1050, thereby implementing a function of the control unit 40. The arithmetic device 1030 of the computer 1000 reads and executes the programs or data (e.g., learning model) from the primary storage device 1040 or the secondary storage device 1050; however, according to another embodiment, the programs may be acquired from other devices via the network N.

6. ADVANTAGE

As described above, the information providing apparatus 10 acquires the first model including: the input layer to which input information is input; the plurality of intermediate layers that performs calculations based on the feature of the input information that has been input; and the output layer that outputs the output information that corresponds to output of the intermediate layer. Then, the information providing apparatus 10 trains the first model such that, when predetermined input information is input to the first model, the first model outputs predetermined output information that corresponds to the predetermined input information and the intermediate information output from a predetermined intermediate layer among the intermediate layers becomes close to the feature information that corresponds to the feature of correspondence information that corresponds to the predetermined input information.

As a result of this training process, the information providing apparatus 10 is capable of generating the first model that outputs the output information that corresponds to the input information based on the feature of the input information in consideration of the feature of correspondence information that corresponds to the input information. Thus, the information providing apparatus 10 is capable of training the learning model that estimates information that corresponds to the user among pieces of information belonging to a certain domain, for example, even when there is a small amount of supervised data belonging to the domain.

Furthermore, the information providing apparatus 10 trains the first model such that, when input information related to the first domain is input as predetermined input information to the first model, the information indicating classification of the input information is output as output information and the intermediate information becomes close to the feature information that takes account of the correspondence information related to the second domain different from the first domain. As a result of this processing, the information providing apparatus 10 is capable of training the learning model that classifies information belonging to the second domain by using supervised data belonging to the first domain.

Furthermore, the information providing apparatus 10 trains the first model such that, when the first information and the second information associated with the first information are input as predetermined input information to the first model, a classification result of the second information is output as output information and the intermediate information becomes close to the feature information that corresponds to the feature of the second information and that takes account of the feature of the third information associated with the first information. For example, the information providing apparatus 10 trains the first model by using the first information and the second information belonging to the first domain and the third information belonging to the second domain different from the first domain. For example, the information providing apparatus 10 trains the first model by using the first information indicating the feature of the user, the second information indicating the selection target selected by the user having the feature indicated by the first information, and the third information indicating the selection target different from the selection target indicated by the second information. As a result of this processing, the information providing apparatus 10 is capable of training the first model that classifies the third information that corresponds to the first information even when there is a small amount of the third information associated with the first information.

Furthermore, the information providing apparatus 10 further acquires the second model having learnt the feature of the third information and trains the first model such that the intermediate information becomes close to the feature information generated from the second information by the second model. Further, the information providing apparatus 10 acquires, as the second model, the model that has previously learnt the feature of the third information that is of the same type as the second information. Thus, the information providing apparatus 10 causes the first model to learn the relationship between the first information and the second information in consideration of the feature of the third information.

Furthermore, the information providing apparatus 10 trains the first model such that the information indicating classification of the second information is output as output information when the first information and the second information are input to the first model and the intermediate information becomes close to the feature information generated by the second model when the second information is input to the second model. Thus, the information providing apparatus 10 may cause the first model to correctly learn the relationship between the first information and the second information in consideration of the feature of the third information.

Furthermore, the information providing apparatus 10 acquires, as the first model, the model including: the first encoder that outputs the first encoded information by encoding the first information when the first information is input; the second encoder that outputs the second encoded information by encoding the second information when the second information is input; the third encoder that outputs the third encoded information by encoding the first information and the fourth encoded information by encoding the second information when the first information and the second information are input; the decoder that generates the first decoded information from the first encoded information and the third encoded information and generates the second decoded information from the second encoded information and the fourth encoded information; and the classifier that includes a plurality of intermediate layers and generates classification information indicating a classification result of the second information from the fourth encoded information. Then, the information providing apparatus 10 trains the first model such that the first information and the first decoded information become similar, the second information and the second decoded information become similar, and the information output from a predetermined intermediate layer among the intermediate layers included in the classifier becomes close to the feature information. In this manner, the information providing apparatus 10 may cause the first model having the configuration of what is called the DSN to learn the relationship between the first information and the second information in consideration of the feature of the third information.

Although some embodiments according to the subject application are described above in detail with reference to the drawings, they are illustrated by an example and, in addition to the aspect described in the disclosure of the present invention, the present invention may be implemented as other embodiments by making various modifications or improvements based on the knowledge of the person skilled in the art.

Furthermore, the above-described "section, module, unit" may be read as "means", "circuit", or the like. For example, an identifying unit may be read as an identifying means or an identifying circuit.

According to an aspect of the embodiment, it is possible to improve the accuracy with which information corresponding to a user is estimated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A training apparatus comprising:
  a processor programmed to:
    acquire a first model including:
      an input layer to which input information is input;
      a plurality of intermediate layers that executes a calculation based on a feature of the input information that has been input; and
      an output layer that outputs output information that corresponds to output of the intermediate layer;

acquire a second model that has learnt a feature of third information; and
train the first model such that:
when predetermined input information is input to the first model, the first model outputs predetermined output information that corresponds to the predetermined input information and intermediate information output from a predetermined intermediate layer among the intermediate layers becomes closer to feature information that corresponds to a feature of correspondence information that corresponds to the predetermined input information;
when input information related to a first domain is input as the predetermined input information to the first model, information indicating classification of the input information is output as the output information and the intermediate information becomes closer to feature information that takes account of correspondence information related to a second domain different from the first domain; and
when first information and second information associated with the first information are input as the predetermined input information to the first model, a classification result of the second information is output as the output information and the intermediate information becomes closer to feature information that corresponds to a feature of the second information and that takes account of a feature of the third information associated with the first information,
the intermediate information is a vector output from a hidden layer of a classifier that is part of the first model at a stage prior to an output layer of the classifier into a function describing a term for training the first model and so that the intermediate information becomes closer to feature information generated from the second information by the second model, the feature information being a vector output from a predetermined hidden intermediate layer among a plurality of intermediate layers included in the second model and input into the function describing the term, the second model being an autoencoder and the predetermined hidden intermediate layer being an intermediate layer prior to decoding,
wherein closeness of information is determined by vector distance.

2. The training apparatus according to claim 1, wherein the processor is programmed to train the first model by using the first information and the second information belonging to the first domain and the third information belonging to the second domain different from the first domain.

3. The training apparatus according to claim 2, wherein the processor is programmed to train the first model by using the first information indicating a feature of a user, the second information indicating a selection target selected by a user having a feature indicated by the first information, and the third information indicating a selection target different from the selection target indicated by the second information.

4. The training apparatus according to claim 1, wherein the processor is programmed to acquire, as the second model, a model that has previously learned a feature of the third information that is of the same type as the second information.

5. The training apparatus according to claim 1, wherein the processor is programmed to train the first model such that, when the first information and the second information are input to the first model, information indicating classification of the second information is output as the output information and the intermediate information becomes closer to feature information generated by the second model when the second information is input to the second model.

6. The training apparatus according to claim 1, wherein the processor is programmed to:
acquire, as the first model, a model including:
a first encoder that outputs first encoded information by encoding first information when the first information is input;
a second encoder that outputs second encoded information by encoding second information when the second information is input;
a third encoder that outputs, when the first information and the second information are input, third encoded information by encoding the first information and fourth encoded information by encoding the second information;
a decoder that generates first decoded information from the first encoded information and the third encoded information and generates second decoded information from the second encoded information and the fourth encoded information; and
a classifier that includes a plurality of intermediate layers and generates, from the fourth encoded information, classification information indicating a classification result of the second information, and
train the first model such that the first information and the first decoded information become more similar to one another, the second information and the second decoded information become more similar to one another, and information output from a predetermined intermediate layer among the intermediate layers included in the classifier becomes closer to the feature information, similarity of information being determined by vector distance.

7. The training apparatus according to claim 1, wherein the predetermined hidden intermediate layer of the second model is a hidden layer that outputs information with a smallest number of dimensions among the intermediate layers included in the second model.

8. A training method executed by a training apparatus, the method comprising:
acquiring a first model including an input layer to which input information is input; a plurality of intermediate layers that executes a calculation based on a feature of the input information that has been input; and an output layer that outputs output information that corresponds to output of the intermediate layer; and
training the first model such that:
when predetermined input information is input to the first model, the first model outputs predetermined output information that corresponds to the predetermined input information and intermediate information output from a predetermined intermediate layer among the intermediate layers becomes closer to feature information that corresponds to a feature of correspondence information that corresponds to the predetermined input information;
when input information related to a first domain is input as the predetermined input information to the first model, information indicating classification of the input information is output as the output information and the intermediate information becomes closer to feature information that takes account of correspondence information related to a second domain different from the first domain; and when first information and second information associated with the first information are input as the predetermined input information to the first model, a classification result of the second information is output as the output information and the intermediate information becomes closer to feature information that corresponds to a feature of the second information and that takes account of a feature of third information associated with the first information, the intermediate information is a vector output from a hidden layer that is part of a classifier of the first model at a stage prior to an output layer of the classifier into a function describing a term for training the first model and so that the intermediate information becomes closer to feature information generated from the second information by a second model, the feature information being a vector output from a predetermined hidden intermediate layer among a plurality of intermediate layers included in the second model and input into the function describing the term, the second model being an autoencoder and the predetermined hidden intermediate layer being an intermediate layer prior to decoding, wherein closeness of information is determined by vector distance.

9. The training method according to claim 8, wherein the predetermined hidden intermediate layer of the second model is a hidden layer that outputs information with a smallest number of dimensions among the intermediate layers included in the second model.

10. A non-transitory computer-readable storage medium having stored therein instructions that cause a computer to execute a process, the instructions comprising:

acquiring a first model including an input layer to which input information is input; a plurality of intermediate layers that executes a calculation based on a feature of the input information that has been input; and an output layer that outputs output information that corresponds to output of the intermediate layer; and training the first model such that:

when predetermined input information is input to the first model, the first model outputs predetermined output information that corresponds to the predetermined input information and intermediate information output from a predetermined intermediate layer among the intermediate layers becomes closer to feature information that corresponds to a feature of correspondence information that corresponds to the predetermined input information;

when input information related to a first domain is input as the predetermined input information to the first model, information indicating classification of the input information is output as the output information and the intermediate information becomes closer to feature information that takes account of correspondence information related to a second domain different from the first domain; and when first information and second information associated with the first information are input as the predetermined input information to the first model, a classification result of the second information is output as the output information and the intermediate information becomes closer to feature information that corresponds to a feature of the second information and that takes account of a feature of third information associated with the first information, the intermediate information is a vector output from a hidden layer of a classifier that is part of the first model at a stage prior to an output layer of the classifier into a function describing a term for training the first model and so that the intermediate information becomes closer to feature information generated from the second information by a second model, the feature information being a vector output from a predetermined hidden intermediate layer among a plurality of intermediate layers included in the second model and input into the function describing the term, the second model being an autoencoder and the predetermined hidden intermediate layer being an intermediate layer prior to decoding, wherein closeness of information is determined by vector distance.

11. The non-transitory computer-readable storage medium according to claim 10, wherein the predetermined hidden intermediate layer of the second model is a hidden layer that outputs information with a smallest number of dimensions among the intermediate layers included in the second model.

* * * * *